(12) United States Patent
Maruyama

(10) Patent No.: US 8,243,702 B2
(45) Date of Patent: Aug. 14, 2012

(54) WIRELESS COMMUNICATION SYSTEM

(75) Inventor: Tomoaki Maruyama, Tochigi (JP)

(73) Assignee: Panasonic Corporation, Osaka (JP)

(*) Notice: Subject to any disclaimer, the term of this patent is extended or adjusted under 35 U.S.C. 154(b) by 672 days.

(21) Appl. No.: 12/439,917

(22) PCT Filed: Aug. 28, 2007

(86) PCT No.: PCT/JP2007/066594
§ 371 (c)(1),
(2), (4) Date: Mar. 4, 2009

(87) PCT Pub. No.: WO2008/029663
PCT Pub. Date: Mar. 13, 2008

(65) Prior Publication Data
US 2010/0046486 A1    Feb. 25, 2010

(30) Foreign Application Priority Data

Sep. 6, 2006   (JP) .................................. 2006-241653

(51) Int. Cl.
*H04W 4/00*     (2009.01)
(52) U.S. Cl. ...... 370/338; 455/3.01; 455/3.06; 455/410; 455/411; 455/435.1; 455/550.1; 455/553.1; 370/328; 370/329; 370/330; 709/227; 709/228; 709/229
(58) Field of Classification Search .................. 455/3.01, 455/3.06, 410, 411, 414.1, 435.1, 435.2, 455/550.1, 553.1; 370/328, 329, 330, 338, 370/282; 709/227, 228, 229
See application file for complete search history.

(56) References Cited

U.S. PATENT DOCUMENTS
6,629,642 B1 * 10/2003 Swartz et al. ............ 235/462.46
(Continued)

FOREIGN PATENT DOCUMENTS
EP     1161031 A2 * 12/2001
(Continued)

OTHER PUBLICATIONS
International Search Report for PCT/JP2007/066594 dated Nov. 8, 2007.

*Primary Examiner* — Olumide T Ajibade Akonai
(74) *Attorney, Agent, or Firm* — Pearne & Gordon LLP

(57) ABSTRACT

It is an object of the present invention to provide a wireless communication system which can allow a wireless LAN terminal device (1000) to establish a connection to a wireless LAN through a simplified procedure. In the wireless communication system, a wireless LAN access point (1100) performs wireless communication with a wireless LAN terminal device (1000) having personal identification information (1005) necessary to identify a person as a registered user. The wireless LAN access point (1100) includes: a wireless interface (1101) operable to receive the personal identification information (1005) outputted from the wireless LAN terminal device (1000), and a connection permitting unit (1102) operable to have an input and output unit (1103) output the personal identification information (1005) received by the wireless interface (1101), wherein the connection permitting unit (1102) receives information on whether or not the connection is permitted by a network manager (1901), and allows the wireless LAN terminal device (1000) to establish the connection when the connection is permitted by the network manager (1901).

16 Claims, 12 Drawing Sheets

U.S. PATENT DOCUMENTS

| | | | |
|---|---|---|---|
| 7,142,842 B2 * | 11/2006 | Rooke et al. | 455/414.1 |
| 7,249,177 B1 * | 7/2007 | Miller | 709/225 |
| 7,848,737 B2 * | 12/2010 | Ramos Robles et al. | 455/411 |
| 7,907,753 B2 * | 3/2011 | Wilson et al. | 382/115 |
| 2001/0048744 A1 | 12/2001 | Kimura | |
| 2004/0067736 A1 | 4/2004 | Kamma | |
| 2005/0021618 A1 | 1/2005 | Isozaki | |
| 2006/0104224 A1 * | 5/2006 | Singh et al. | 370/310 |
| 2006/0146765 A1 | 7/2006 | Van De Sluis et al. | |
| 2006/0251256 A1 * | 11/2006 | Asokan et al. | 380/270 |

FOREIGN PATENT DOCUMENTS

| | | |
|---|---|---|
| JP | 11-259393 A | 9/1999 |
| JP | 2001-345819 A | 12/2001 |
| JP | 2003-162506 A | 6/2003 |
| JP | 2004-072327 A | 3/2004 |
| JP | 2006-005879 A | 1/2006 |
| JP | 2006-518507 A | 8/2006 |
| WO | 2005/125151 A2 | 12/2005 |

* cited by examiner

FIG. 3
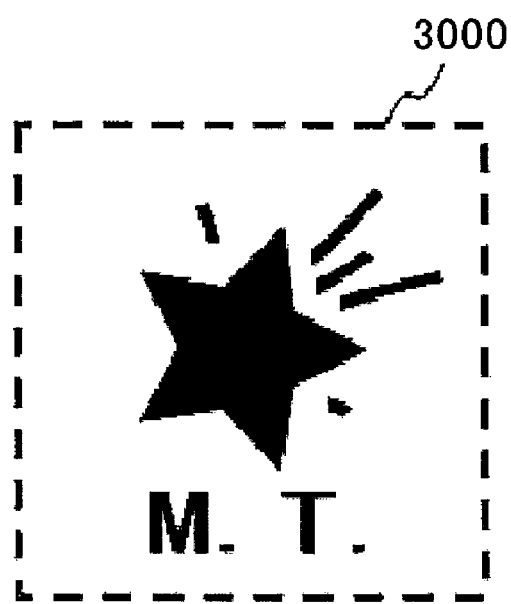
3000
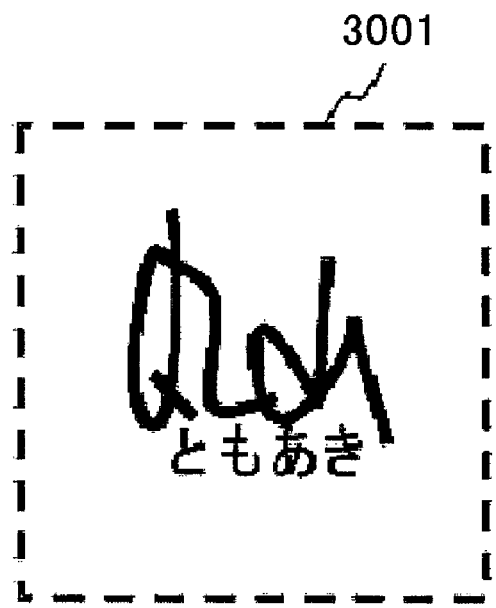
3001
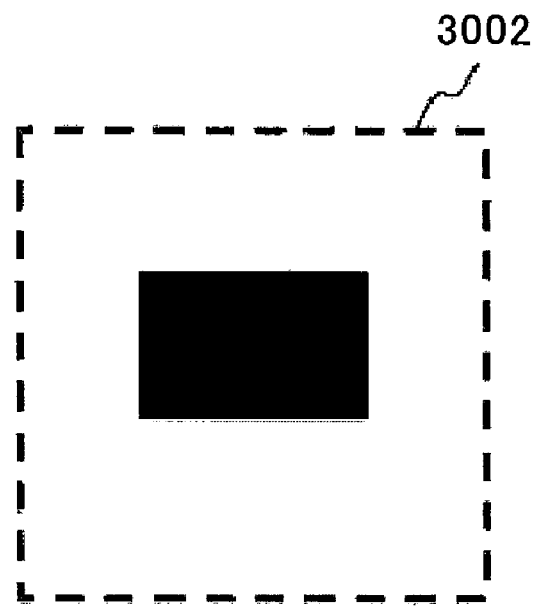
3002

FIG. 4

| ROW NUMBER | FILE FOR ICON |
|---|---|
| 1 | <?xml version="1.0" encoding="UTF-8" standalone="no"?> |
| 2 | <!DOCTYPE svg PUBLIC "-//W3C//DTD SVG 1.0//EN" |
| 3 | "http://www.w3.org/TR/2001/REC-SVG-20010904/DTD/svg10.dtd"> |
| 4 | <svg |
| 5 |   xmlns="http://www.w3.org/2000/svg" |
| 6 |   xmlns:xlink="http://www.w3.org/1999/xlink" |
| 7 |   version="1.0" |
| 8 |   x="0" |
| 9 |   y="0" |
| 10 |   width="744.094482" |
| 11 |   height="1052.36218" |
| 12 |   id="svg686" |
| 13 |   xml:space="preserve"> |
| 14 |   <defs id="defs688" /> |
| 15 |   <rect |
| 16 |     width="378.71637" |
| 17 |     height="274.820679g |
| 18 |     x="187.682434" |
| 19 |     y="301.632446" |
| 20 |     style="font-size:12;fill-rule:evenodd;" |
| 21 |     id="rect689" /> |
| 22 | </svg> |
| 23 | <!-- UUID:15c8ad12-47c7-4448-aa09-1f09cd4a4189 --> |
| 24 | <!-- MD5: b188fc002d2b974dd7f886648b833d3e --> |

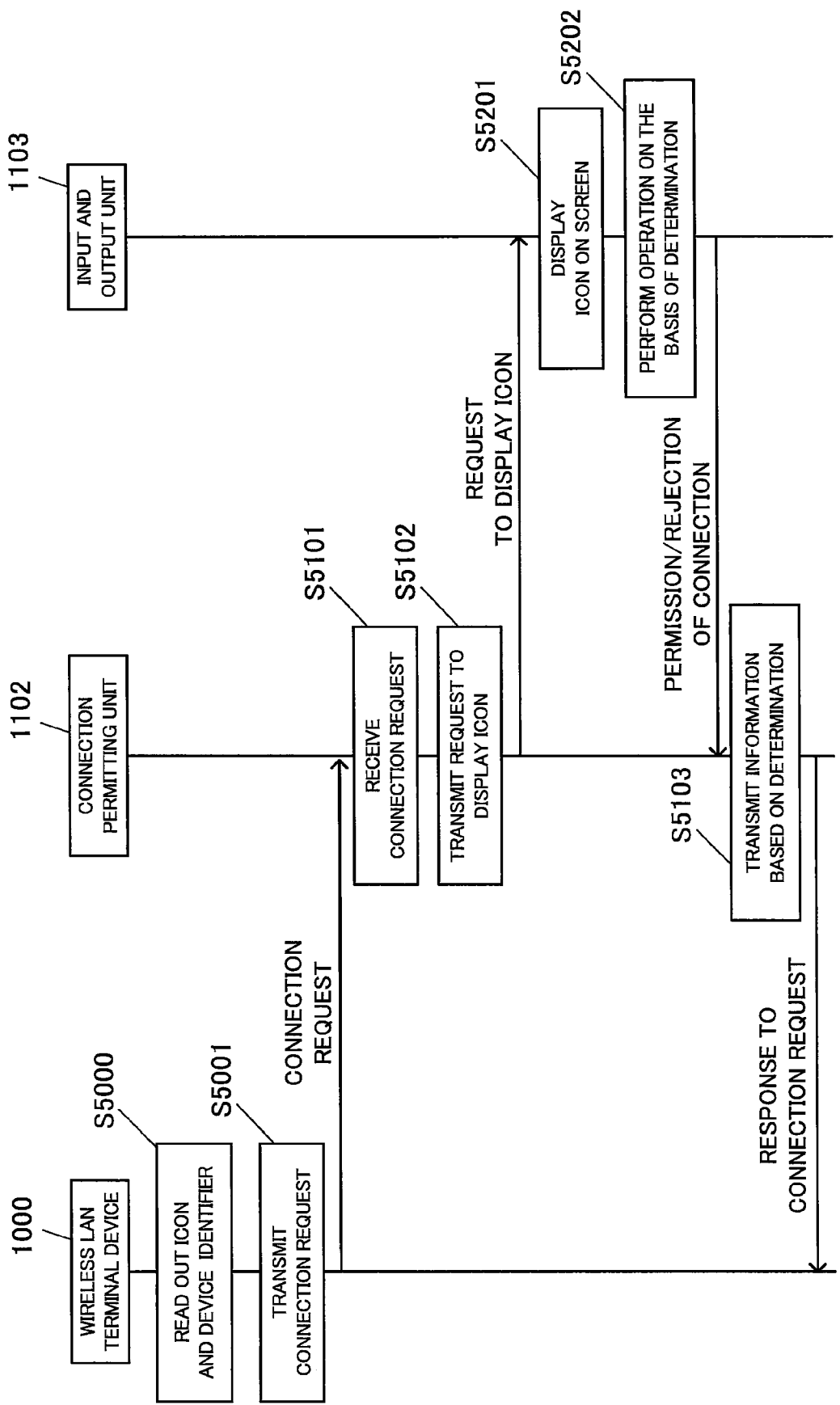

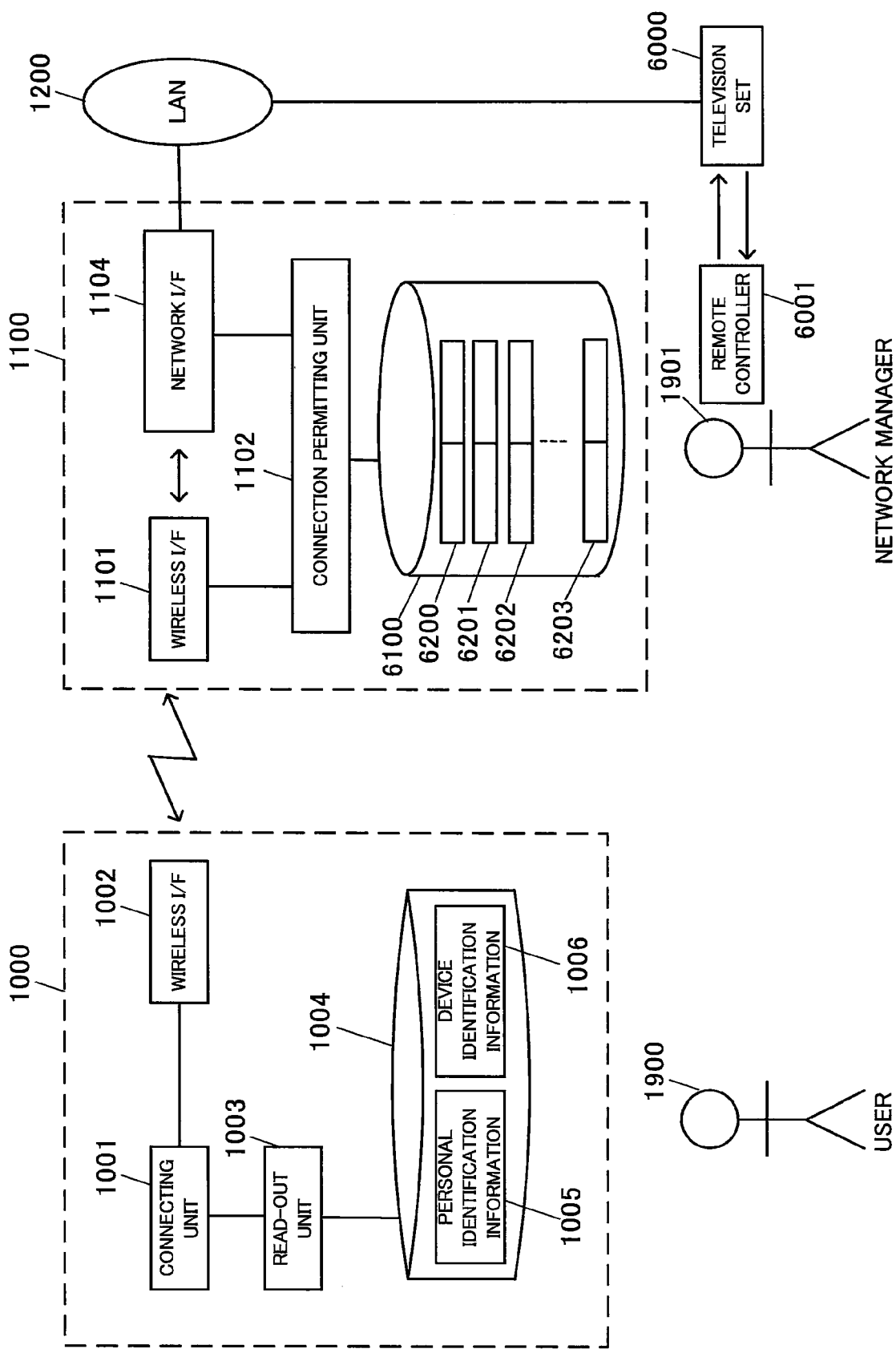

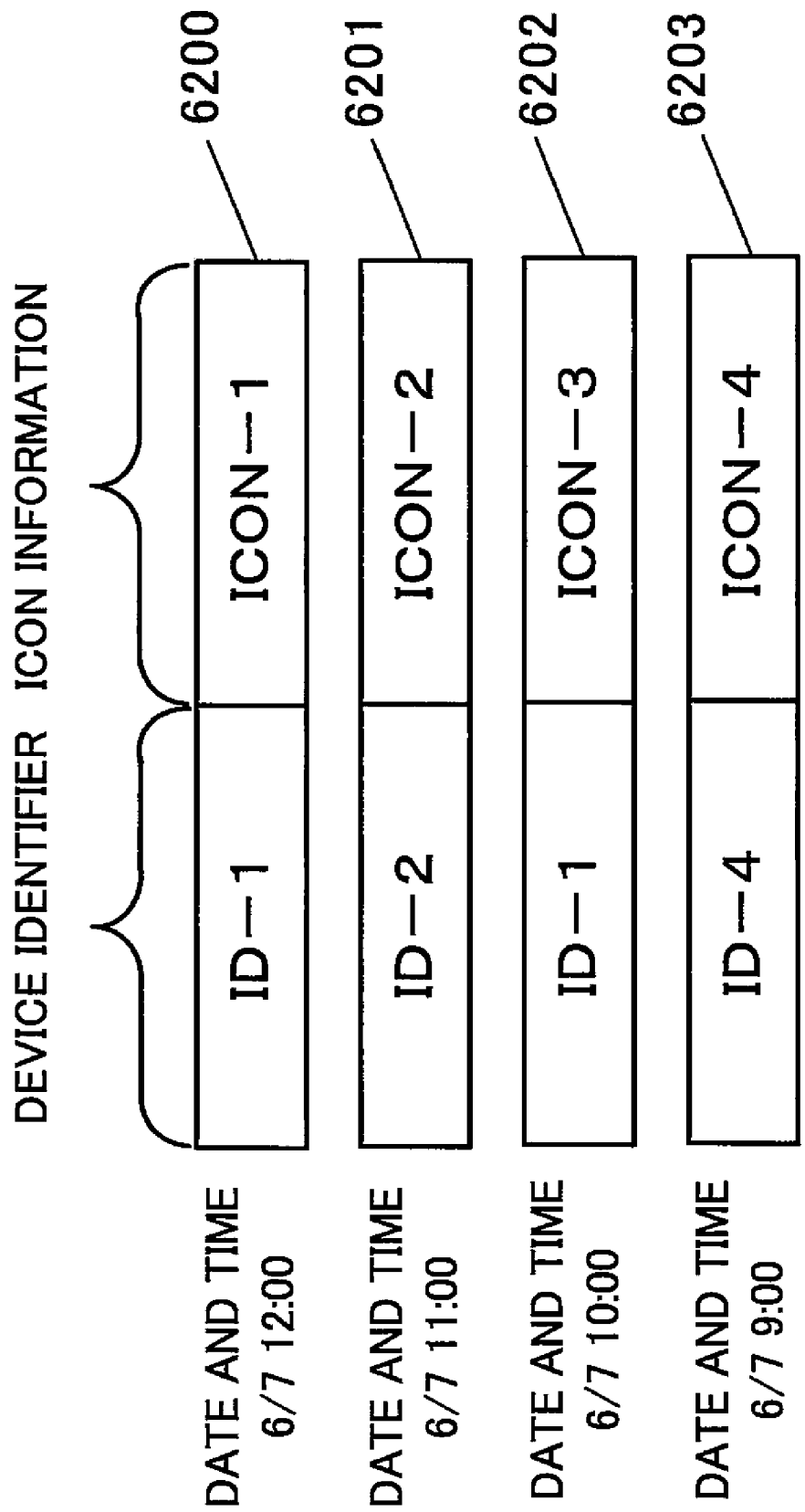

FIG. 9

| DATE AND TIME | DEVICE IDENTIFIER | ICON INFORMATION | DETERMINATION | |
|---|---|---|---|---|
| 6/7 12:00 | ID-1 | ICON-1 | PERMITTED | 9001 |
| 6/7 11:00 | ID-2 | ICON-2 | REJECTED | 9002 |
| 6/7 10:00 | ID-1 | ICON-3 | PERMITTED | 9003 |
| 6/7 9:00 | ID-4 | ICON-4 | PERMITTED | 9004 |

WIRELESS COMMUNICATION SYSTEM

TECHNICAL FIELD OF THE INVENTION

The present invention relates to a system for wireless communication, and more particularly to a wireless communication system for small scale networks such as wireless local area network and the like.

BACKGROUND OF THE INVENTION

In recent year, the Internet has been intergraded into many aspects of our lives, and faces following problems. Even if we can use the Internet at home, in the office, and in public spaces, it is difficult to newly install a wired local area network (hereinafter simply referred to as "wired LAN") in an ordinary and old house. Further, the wired LAN is unfit for a mobile computer to be carried if necessary. On the other hand, a wireless local area network (hereinafter simply referred to as "wireless LAN") using relatively expensive network equipments such as network interface card, router and the like is fit for the mobile computer. We think that the wireless LAN, which meets consumer demand for convenient items and the like, will be widely used in the future in comparison with the wired LAN.

No one knows for sure that the wireless LAN exceeds the wired LAN. The wireless LAN is relatively expensive, and faces following problems. The conventional wireless LAN has a weak side regarding network security. In the wired LAN, the network manager can checks visible lines between network equipments. On the other hand, the network manager cannot check an invisible connection between a network point and a wireless terminal device in the wireless LAN, and cannot detect a wireless terminal device for surreptitious interception at a glance. Therefore, the wireless LAN is required to have a high protection function for preventing information transferred between clients and servers from being intercepted. It is preferred that the network manager skilled in the art register wireless LAN terminal devices to be connected to the access point by wireless, and set the name of the access point and a cryptography key, and routinely checks access log recorded in the access point to detect improper use of the network.

Therefore, it is not a good idea to expect a user to manage a local area network installed in his/her home. In order to put a wireless LAN into every home, the wireless LAN system is required to simply set information needed for encryption and authentication.

The above-mentioned conventional wireless LAN system has a wireless LAN terminal device and an access point. When the access point is ON, the access point can receive only an initial setting packet transmitted from the wireless terminal device, the access point produces and registers a wired equivalent privacy key (hereinafter simply referred to as "WEP key") the same as that of the wireless terminal device (see, for example, patent document 1).
Patent document 1: Japanese Patent Laid-Open Publication 2005-142907

DISCLOSURE OF THE INVENTION

Problems to be Solved by the Invention

In the above-mentioned conventional wireless communication system, it is easy for a user to set initialization information for encryption and authentication to the access point and the wireless LAN terminal device. On the other hand, it is difficult for the user to update or change the information set in the access point and the wireless LAN terminal device.

The conventional wireless LAN system installed in a house cannot allow the user to temporally use the wireless LAN installed in the house to ensure that his/her wireless terminal device is temporally connected to the wireless LAN when he/she is in the house.

It is therefore an object of the present invention to provide a wireless communication system which can allow a wireless LAN terminal device to establish a connection to a wireless LAN through a simplified procedure.

Means for Solving the Problems

In order to attain the above-mentioned object, a wireless communication system according to the present invention performs wireless communication with a wireless terminal device having personal identification information necessary to identify a person as a registered user, comprises: a wireless communication unit operable to receive the personal identification information outputted from the wireless terminal device through a wireless communication network; a personal identification information output control unit operable to have an information output device output the personal identification information received by the wireless communication unit; and a connection permitting unit operable to receive information on whether or not a connection is permitted by a network manager on the basis of the personal identification information received by the wireless communication unit, and to allow the wireless terminal device to establish the connection when the connection is permitted by the network manager.

The wireless communication apparatus thus constructed can allow a wireless terminal device to establish a connection to a wireless network through a simplified procedure when the connection is permitted by the network manager, by reason that the connection permitting unit receives information on when the connection is permitted by the network manager on the basis of the personal identification information received by the wireless communication unit, and allows the wireless terminal device to establish the connection when the connection is permitted by the network manager.

The wireless communication apparatus according to the present invention may further comprise: a communication unit operable to perform communication with a network different from the wireless communication network, wherein the communication unit relays data from the wireless communication network to the network different from the wireless communication network.

The wireless communication apparatus thus constructed can perform communication with the network different from the wireless communication network.

The wireless communication apparatus according to the present invention may further comprise: a database having information corresponding to the personal identification information and information corresponding to device identification information necessary to identify a device as a registered device, wherein the wireless communication unit receives the personal identification information and device identification information from the wireless terminal device through the wireless communication network, and the personal identification information output control unit has the information output device output the personal identification information and the device identification information received by the wireless communication unit on the basis of a condition resulting from the information stored in the database and the personal identification information and the device identification information received by the wireless communication unit.

The wireless communication apparatus thus constructed can determine, through a simplified procedure, whether or not to allow a wireless terminal device to establish a connection to a wireless network when the connection is permitted by the network manager, by reason that the personal identification information output control unit has the information output device output the personal identification information and the device identification information received by the wireless communication unit on the basis of a condition resulting from the information stored in the database and the personal identification information and the device identification information received by the wireless communication unit.

In the wireless communication apparatus according to the present invention, when it is determined that the personal identification information received by the wireless communication unit is the same as personal identification information stored in the database, and the device identification information received by the wireless communication unit is not the same as device identification information related to personal identification information determined as being the same as the personal identification information received by the wireless communication unit, the personal identification information output control unit may have the information output device output the personal identification information received by the wireless communication unit as a warning for the network manager.

The wireless communication apparatus thus constructed can determine, through a simplified procedure, whether or not to allow a wireless terminal device to establish a connection to a wireless network, by reason that the personal identification information output control unit warns the network manager when the device identification information received by the wireless communication unit is not the same as device identification information related to personal identification information determined as being the same as the personal identification information received by the wireless communication unit.

In the wireless communication apparatus according to the present invention, when it is determined that the device identification information received by the wireless communication unit is the same as device identification information stored in the database, and the personal identification information received by the wireless communication unit is not the same as personal identification information corresponding to device identification information determined as being the same as the device identification information received by the wireless communication unit, the personal identification information output control unit has the information output device output the personal identification information received by the wireless communication unit and the personal identification information corresponding to device identification information determined as being the same as the device identification information received by the wireless communication unit.

The wireless communication apparatus thus constructed can determine, through a simplified procedure, whether or not to allow a wireless terminal device to establish a connection to a wireless network, by reason that when it is determined that the personal identification information received by the wireless communication unit is not the same as personal identification information corresponding to device identification information determined as being the same as the device identification information received by the wireless communication unit, the personal identification information output control unit has the information output device output the personal identification information received by the wireless communication unit and the personal identification information corresponding to device identification information determined as being the same as the device identification information received by the wireless communication unit.

In the wireless communication apparatus according to the present invention, when it is determined that the device identification information received by the wireless communication unit is the same as device identification information contained in the database, and the personal identification information received by the wireless communication unit is the same as personal identification information corresponding to device identification information determined as being the same as the device identification information received by the wireless communication unit, the personal identification information output control unit informs the network manager that the connection is established on the basis of the personal identification information and the device identification information received by the wireless communication unit by having the information output device output the personal identification information received by the wireless communication unit.

The wireless communication apparatus thus constructed can determine, through a simplified procedure, whether or not to allow a wireless terminal device to establish a connection to a wireless network, by reason that when it is determined that the personal identification information received by the wireless communication unit is the same as personal identification information corresponding to device identification information determined as being the same as the device identification information received by the wireless communication unit, the personal identification information output control unit informs the network manager that the connection is established on the basis of the personal identification information and the device identification information received by the wireless communication unit.

In the wireless communication apparatus according to the present invention, information on whether or not the connection was previously permitted by the network manager is related to the information stored in the database, and stored in the database, the personal identification information output control unit may inform the network manager about whether or not the connection was previously permitted by the network manager, by having the information output device output the personal identification information received by the wireless communication unit.

The wireless communication apparatus thus constructed can determine, through a simplified procedure, whether or not to allow a wireless terminal device to establish a connection to a wireless network, by reason that the personal identification information output control unit informs the network manager about whether or not the connection was previously permitted by the network manager.

In the wireless communication apparatus according to the present invention, instead of having the personal identification information output control unit inform the network manager about whether or not the connection was previously permitted by the network manager, by having the information output device output the personal identification information received by the wireless communication unit, the connection permitting unit may allow the wireless terminal device to establish the connection when the information stored in the database indicates that the connection was previously permitted by the network manager.

The wireless communication apparatus thus constructed can automatically allow the wireless terminal device to establish the connection when the information stored in the database indicates that the connection was previously permitted by the network manager, by reason that the connection permitting unit allows the wireless terminal device to establish the connection when the information stored in the database indicates that the connection was previously permitted by the network manager.

In the wireless communication apparatus according to the present invention, a network connected to a television set is different from the wireless communication network, the personal identification information output control unit may have the information output device output, to the television set, the personal identification information received by the wireless communication unit, the connection permitting unit may receive, from the television set, information about whether or not the network manager has permitted the wireless terminal device to establish the connection on the basis of the personal identification information outputted by the television set.

The wireless communication apparatus thus constructed can check, with the network manager, whether or not to permit the wireless terminal device to establish the connection by using the television set.

The wireless communication apparatus according to the present invention may further comprise: a communication unit having the personal identification information, wherein when the connection is permitted by the network manager, the communication unit transmits, through the wireless communication network, the personal identification information to a wireless terminal device which has been permitted to establish the connection.

The wireless communication apparatus thus constructed can permit the connection in a matter that the wireless terminal device is directly connected to a designated device without an access point having a relay function.

In the wireless communication apparatus according to the present invention, the personal identification information may be constituted by information about an icon, the information being expressed in a form necessary to scale the icon to a designated size.

The wireless communication apparatus thus constructed can use the personal identification information as an icon expressed in a form necessary to scale the icon to a designated size.

In the wireless communication apparatus according to the present invention, the personal identification information may be constituted by information about an icon which has an image, a portrait, or a sketch of a face or a body of a user of the wireless terminal device being expressed in a form necessary to scale the icon to a designated size.

The wireless communication apparatus thus constructed can use the personal identification information as an icon having an image, a portrait, or a sketch of a face or a body of a user of the wireless terminal device being expressed in a form necessary to scale the icon to a designated size.

In the wireless communication apparatus according to the present invention, the personal identification information may be constituted by information about an icon which has a voice of a user of the wireless terminal device.

The wireless communication apparatus thus constructed can use the personal identification information as an icon having a voice of a user of the wireless terminal device.

In the wireless communication apparatus according to the present invention, the personal identification information may be constituted by information about an icon which has a name or initials of a user of the wireless terminal device.

The wireless communication apparatus thus constructed can use the personal identification information as an icon having a name or initials of a user of the wireless terminal device.

In the wireless communication apparatus according to the present invention, the personal identification information may be constituted by information about an icon which has an image showing a signature or a seal of a user of the wireless terminal device.

The wireless communication apparatus thus constructed can use the personal identification information as an icon having an image showing a signature or a seal of a user of the wireless terminal device.

In the wireless communication apparatus according to the present invention, the connection permitting unit may disconnect the wireless terminal device from the wireless communication network when the wireless terminal device is used outside a cellular phone's communication area, after establishing the connection.

The connection permitting unit disconnects the wireless terminal device from the wireless communication network when the wireless terminal device is used outside a cellular phone's communication area, after establishing the connection. When the wireless terminal device is connected to the wireless communication network again, the network manager can determine, through a simplified procedure, whether or not to permit the wireless terminal device to establish the connection. Therefore, the wireless communication apparatus thus constructed can improve a network security.

In the wireless communication apparatus according to the present invention, the connection permitting unit may disconnect the wireless terminal device from the wireless communication network when a predetermined period of time has elapsed since the wireless terminal device established the connection.

The connection permitting unit disconnects the wireless terminal device from the wireless communication network when a predetermined period of time has elapsed since the wireless terminal device established the connection. When the wireless terminal device is connected to the wireless communication network again, the network manager can determine, through a simplified procedure, whether or not to permit the wireless terminal device to establish the connection. Therefore, the wireless communication apparatus thus constructed can improve a network security.

In the wireless communication apparatus according to the present invention, the personal identification information output control unit may continue to have the information output device output the personal identification information received by the wireless communication unit until the connection permitting unit disconnects the wireless terminal device from the wireless communication network.

The wireless communication apparatus thus constructed can inform the network manager about whether or not the wireless terminal device has been disconnected from the wireless communication network, by reason that the personal identification information output control unit continues to have the information output device output the personal identification information received by the wireless communication unit until the connection permitting unit disconnects the wireless terminal device from the wireless communication network.

A wireless communication system according to the present invention comprises: a wireless terminal device having personal identification information necessary to identify a person as a registered user; and a wireless communication apparatus operable to perform communication with the wireless terminal device, wherein the wireless communication apparatus includes: a wireless communication unit operable to receive the personal identification information outputted from the wireless terminal device through a wireless communication network; a personal identification information output control unit operable to have an information output device output the personal identification information received by the wireless communication unit; and a connection permitting unit operable to receive information on whether or not a connection is permitted by a network manager on the basis of the personal identification information received by the wireless communication unit, and to allow the wireless terminal device to establish the connection when the connection is permitted by the network manager.

The wireless communication system thus constructed can allow a wireless terminal device to establish a connection to a wireless network through a simplified procedure when the connection is permitted by the network manager, by reason that the connection permitting unit receives information on when the connection is permitted by the network manager on the basis of the personal identification information received by the wireless communication unit, and allows the wireless terminal device to establish the connection when the connection is permitted by the network manager.

A wireless communication system according to the present invention comprises: a wireless terminal device operable to function as a client peer, the wireless terminal device having personal identification information necessary to identify a person as a registered user; and a wireless terminal device operable to function as a server peer to perform communication with the wireless terminal device functioning as the client peer, wherein the wireless terminal device operable to function as the server peer includes: a wireless communication unit operable to receive, through a wireless communication network, the personal identification information outputted from the wireless terminal device functioning as the client peer; a personal identification information output control unit operable to have an information output device output the personal identification information received by the wireless communication unit; and a connection permitting unit operable to receive information on whether or not a connection is permitted by a network manager on the basis of the personal identification information received by the wireless communication unit, and allow the wireless terminal device functioning as the client peer to establish the connection when the connection is permitted by the network manager.

In the wireless communication system thus constructed, the wireless terminal device functions as the server peer to allow the wireless terminal device functioning as the client peer to establish a connection to a wireless network through a simplified procedure when the connection is permitted by the network manager, by reason that the connection permitting unit receives information on when the connection is permitted by the network manager on the basis of the personal identification information received by the wireless communication unit, and allows the wireless terminal device functioning as the client peer to establish the connection when the connection is permitted by the network manager.

Advantageous Effect of the Invention

It is an object of the present invention to provide a wireless communication system which can allow a wireless terminal device to establish a connection to a wireless LAN through a simplified procedure.

In the wireless communication system according to the present invention, the user can designate an access point without having expertise and understanding technical terms such as media access control address (MAC address), wired equivalent privacy key (WEP key) and the like.

It is a further object of the present invention to provide a wireless communication system which can identify a wireless terminal device which is about to request a connection to a wireless communication network through a simplified procedure, and determine whether or not to allow the wireless terminal device to establish the connection through a simplified procedure. Therefore, the user can intuitively manage the wireless communication network as a network manager.

BRIEF DESCRIPTION OF THE DRAWINGS

FIG. 3 is a view showing three image icons as an example.

FIG. 4 is a view showing an inner expressive form for an icon as an example.

FIG. 5 is a sequence diagram showing the wireless LAN system according to the first embodiment of the present invention.

FIG. 6 is a block diagram showing the wireless LAN system according to the second embodiment of the present invention.

FIG. 7 is a block diagram explaining combinations of icon information and device identifier.

FIG. 9 is a block diagram explaining combinations of icon information, device identifier, and determination.

EXPLANATION OF THE REFERENCE NUMERALS

1000: wireless LAN terminal device
1001: connecting unit
1002: wireless interface
1003: read-out unit
1004: memory unit
1005: personal identification information
1006: device identification information
1100: wireless LAN access point
1101: wireless interface
1102: connection permitting unit
1103: input and output unit
1104: network interface
1200: local area network (LAN)
1900: user
1901: network manager
2000: house
2001 and 6000: television set
3000, 3001, and 3002: image icon
6001: remote controller
6100: access record database
8000: screen 8001: area
8002: icon
11001 and 11002: mobile terminal device
11003 and 11004: user
12001: communication interface
12002: interprocess communication (IPC)
12003: server processing unit
12004: client processing unit Preferred Embodiment of the Invention The first to third embodiments of a wireless communication system according to the present invention will be described hereinafter with reference to accompanying drawings. In each embodiment, the wireless communication system is exemplified by a wireless local area network system (hereinafter simply referred to as "wireless LAN system") in which the wireless communication is performed with reference to IEEE (Institute of Electrical and Electronics Engineers) 802.11 series or the like, or in which peer-to-peer communication is performed with reference to Bluetooth (IEEE 802.15) or the like.

First Embodiment

Figure 1:
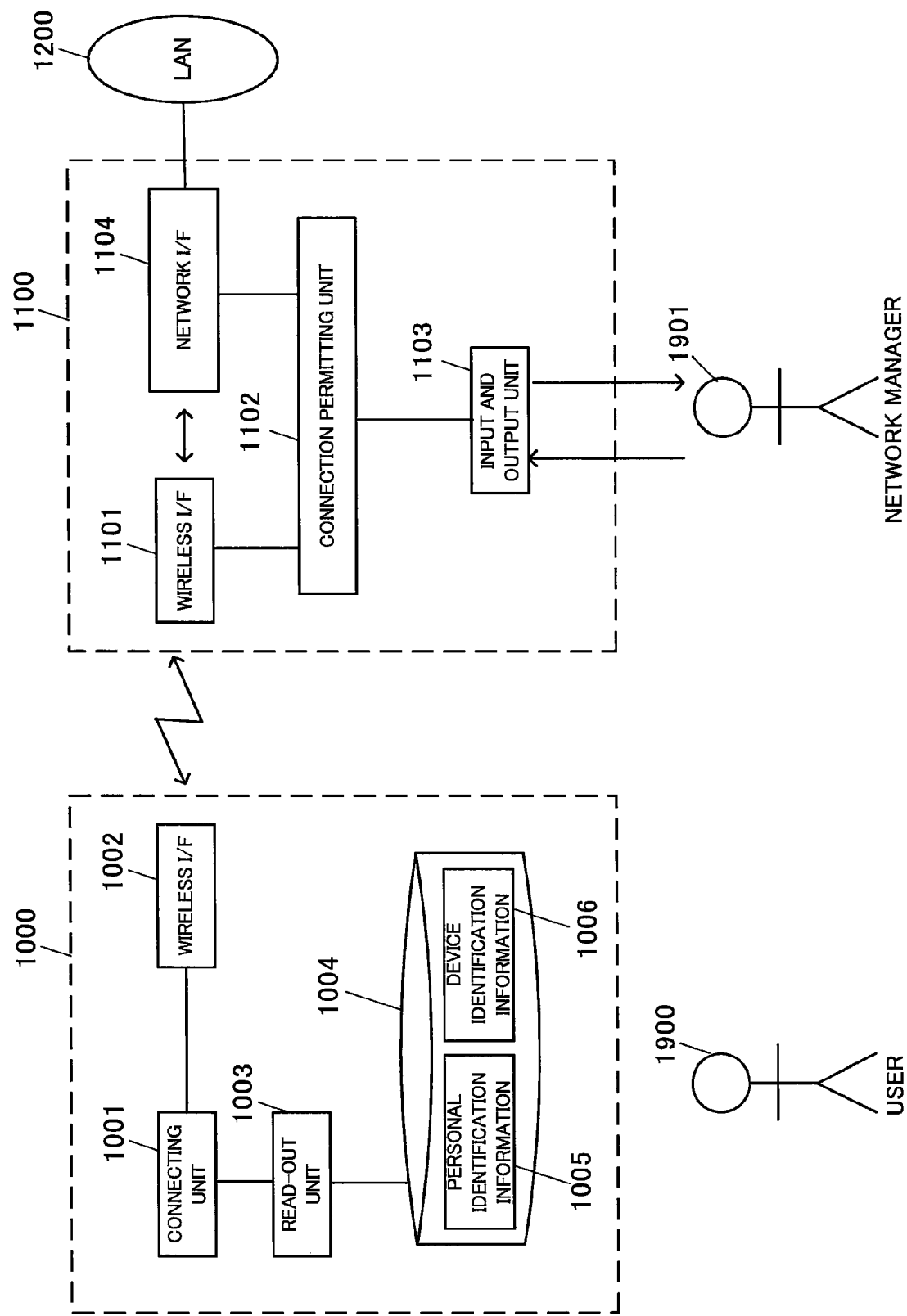
FIG. 1 is a block diagram showing the construction of the wireless LAN system according to the first embodiment of the present invention.

FIG. 1 is a block diagram showing the construction of the wireless LAN system according to the first embodiment of the present invention.

As shown in FIG. 1, a wireless LAN terminal device 1000 includes a connecting unit 1001, a wireless interface 1002, a read-out unit 1003, a memory unit 1004, and the like (for example an application program and a power control unit) necessary to function as a wireless LAN terminal device. The wireless LAN terminal device 1000 may have a central processing unit (CPU). The functions of the connecting unit 1001 and the read-out unit 1003 may be realized by the CPU.

The connecting unit 1001 establishes a connection (data link) to a wireless LAN access point 1100 by performing wireless communication with the wireless LAN access point 1100 with reference to a predetermined protocol such as for example IEEE 802.11 series.

The wireless interface 1002 performs wireless communication with a wireless interface 1101 of the wireless LAN access point 1100 specified as a peer, with reference to a predetermined wireless communication protocol, and establishes a connection (data link) to the wireless interface 1101. The established connection (data link) allows the wireless LAN terminal device 1000 to transmit and receive packets from the wireless LAN access point 1100.

The operations of the wireless interfaces will not be explained hereinafter under the assumption that the connection between the wireless interfaces has been established in this embodiment. Therefore, for example, the connecting unit 1001 will be explained as a unit which can perform wireless communication with, and transmit event data to modules (such as connection permitting unit 1102 and the like) of the wireless LAN access point 1100.

The read-out unit 1003 can read out data object from a designated position in the memory unit 1004. The read-out unit 1003 can store, delete, and update data object stored in the memory unit 1004. More specifically, the memory unit 1004 may be constituted by file system, repository, or database defined on a hard disc, a flash memory device, or the like. The data object of the file system is constituted as a file, a directly, a folder, or the like. The data object of the repository is constituted as a subtree, a value, or the like. The data object of the database is constituted as a table or the like.

In the wireless LAN system according to the first embodiment of the present invention, the memory unit 1004 has personal identification information 1005 and device identification information 1006. The personal identification information 1005 may include information of an icon such as image icon, sound icon, and image and sound icon. The image icon may be constituted by characters, figure, still image, moving picture, or combination of characters, a figure, a still image, and a moving picture. The sound icon may be constituted by voice, music, or combination of voice and music. The image and sound icon is constituted by a combination of image and sound.

In other words, the personal identification information 1005 is, on a conceptual basis, roughly the same as marks based on the Japanese Trademark Law (such as character mark, design mark, symbol mark, combined mark, except for three-dimensional mark) moving mark, sound mark and the like. As one example of the personal identification information 1005, icons will be described hereinafter with reference to FIGS. 3 and 4.

The device identification information 1006 is used to identify a terminal device as a registered device, and constituted by numbers and/or characters. The device identification information 1006 assigned to a wireless LAN terminal device is distinguishable from those of other terminal devices. In this embodiment, the device identification information is exemplified by media access control address (hereinafter simply referred to as "MAC address") in view of the affinity of the device identification information for wireless LAN protocol such as IEEE 802. Strictly speaking, the term "MAC address" is intended to indicate addresses assigned to respective wireless interfaces, and not intended to indicate an address for the device. However, so-called "terminal device" to be connected to the LAN has only one wireless interface. Therefore, the network LAN terminal device has only one MAC address as the device identification information in this embodiment.

The wireless LAN access point 1100 includes a wireless interface 1101, a connection permitting unit 1102, an input and output unit 1103, and a network interface 1104. Here, the wireless interface 1101 is the same in construction as the wireless interface 1002.

The wireless LAN terminal device according to the present invention includes a wireless communication unit, a personal identification information output control unit, and a connection permitting unit. In this embodiment, the wireless communication unit is exemplified by the wireless interface 1101, the personal identification information output control unit and the connection permitting unit are constituted by the connection permitting unit 1102, the information output device is constituted by an input and output unit 1103 or a network-ready television set which will be described hereinafter, and the communication unit is exemplified by a network interface. The wireless LAN access point 1100 may have a central processing unit (CPU), while the function of the connection permitting unit 1102 may be realized by the CPU.

The connection permitting unit 1102 performs data processing routine related to a determination on whether or not to permit any wireless LAN terminal device to establish a connection to the wireless LAN access point 1100 in response to a connection request from the wireless LAN terminal device. When the network manager 1901 permits the wireless LAN terminal device to establish the connection, the wireless LAN access point 1100 relay packets received from the permitted wireless LAN terminal device to a designated device, and relay packets received from the designated device to the permitted wireless LAN terminal device.

The input and output unit 1103 is constituted by a network-ready television set, display device, or the like for displaying an image on a screen, reproducing a sound, and receiving information inputted by the network manager. Specifically, the input and output unit 1103 is constituted by liquid crystal display, operation buttons, mouse, and the like having functions necessary to input and output data to the wireless LAN access point 1100.

The network interface 1104 functions as an interface connected to a local area network (LAN) 1200 installed at home or the office, and provided with 10 Base-T Ethernet, hub, and the like.

The network interface 1104 has been described as a module which is not essential to the wireless LAN access point 1100. The LAN 1200 will be described as a wired LAN in this embodiment. The advantageous effects of the present invention are not changed even if the LAN 1200 will be described as a wireless LAN.

In general, a product sold in the marketplace as the wireless LAN access point 1100 has an interface to be connected to a wired LAN. The interface is used as a gateway which connects a wireless LAN terminal device to the wired LAN. Therefore, the wireless LAN access point 1100 will be explained as functioning as a gateway in this embodiment.

In this embodiment, the wireless LAN terminal device 1000 is exemplified by a mobile terminal device, and described as being used by only one user 1900. However, the wireless LAN terminal device 1000 may be used by two or more users. The advantageous effects of the present invention are not changed even if the mobile terminal device is used by two or more users. In this case, the mobile terminal device may have icon information about icons corresponding to users, and selectively output icon information corresponding to a user currently using the mobile terminal device. For example, the memory unit 1004 may be constituted by a subscriber identity module card (SIM card), two or more users having respective SIM cards each having individual icon information under the condition that the wireless LAN terminal device 1000 is constituted by the third-generation mobile phone.

The network manager 1901 can permit the wireless LAN terminal device 1000 to establish a connection to the wireless LAN by operating the wireless LAN access point 1100 through the input and output unit 1103.

The term "network manager" is intended to indicate a person which can operate the wireless LAN access point 1100, and which is not required to have a special skill. If, for example, the wireless LAN access point is installed in Mr. or Ms. A's house, Ms. A's family may be defined as a network manager.

Figure 2:
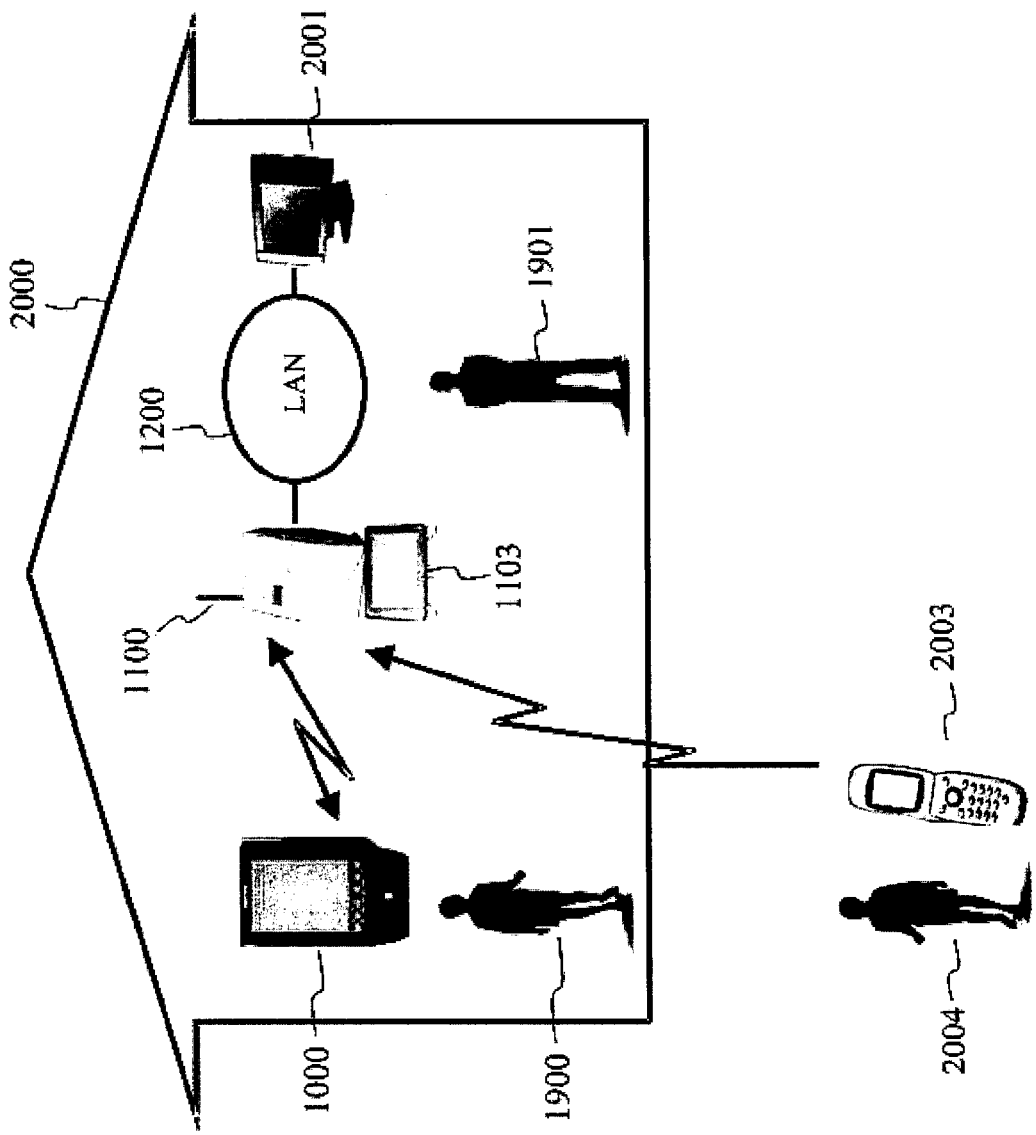
FIG. 2 is a schematic view showing a wireless LAN access point and a LAN installed in a house.

FIG. 2 is a schematic view showing a wireless LAN access point 1100 and a LAN 1200 installed in a house. The elements of the wireless LAN access point and the LAN the same in construction as those of the wireless LAN access point and the LAN shown in FIG. 1 will not described hereinafter.

The network manager 1901 owns a house 2000. The user 1900 having a wireless LAN terminal device 1000 is in the house 2000. Here, the user 1900 has the wireless LAN terminal device 1000 in one hand although the situation is not described in detail in FIG. 2. The user 1900 and the network manager 1901 are in the same room.

As shown in FIG. 2, the user 2004 is in the vicinity of the house 2000. However, the network manager 1901 is not really aware that the user 2004 is in the vicinity of the house 2000, and has a wireless LAN terminal device 2003. In this time, the wireless LAN terminal device 2003 is within a service area of the wireless LAN access point 1100.

The LAN 1200 is connected to a network-ready television set (hereinafter simply referred to as "TV set") 2001 operable to receive television broadcasts. Here, the TV set 2001 meets standards formulated by the Digital Living Network Alliance (DLNA) and the like. The TV set 2001 is connected to a wired LAN, has a streaming function, and plays the video while downloading video information from the wired LAN.

FIG. 3 is a view showing three image icons as an example. In this embodiment, black-and-white image icons are drawn and shown in FIG. 3. However, many colors may be used to draw image icons. Here, the image icon 3000 is inspired by initial characters "M.T." and a star twinkled in the sky. The image icon 3001 is inspired by name written in Japanese. The image icon 3002 is inspired by a figure. The icon may be constituted by a sound as a sound icon although the sound is not expressed by figures and words, and may be constituted by the combination of a sound and an image as a sound and image icon.

Each of the image icons shown in FIG. 3 is recognized as a user or his/her terminal device, and required to be unique and distinguishable from those of another users or their terminal devices. Therefore, the user can devise an image icon to be stored in his terminal device, or may request someone to create an image icon to be stored in his terminal device. In other words, the image icon is stored as his/her symbol mark, like an electronic seal or a company trademark.

If it is troublesome to devise an icon, or request someone to create an icon, the icon may be produced from, for example, the combination of his/her picture and name, his/her child or favorite pet. Further, the icon may be downloaded from a website for providing a service (automatically producing an icon from user's name, favorite, and your choice of figure).

FIG. 4 is a view showing, as an example, inner expressive form needed to express an image icon. The inner expressive form shown in FIG. 4 expresses an image icon on the basis of scalable vector graphics (SVG) of the World Wide Web Consortium (W3C). On the other hand, the inner expressive form may express an image icon on the basis of, for example, JPEG format (ISO/IEC JTC 1/SC 29/WG1, Joint Photographic Experts Group). As shown in FIG. 4, row numbers are assigned to respective rows of the inner expressive form based on the SVG format.

When the bitmapped image based on the JPEG format or the like is scaled up, the roughness of the bitmapped image is remarkably increased. When, on the other hand, the bitmapped image based on the JPEG format or the like is scaled down, the bitmapped image is out of recognition. In order to solve the above-mentioned problems, it is preferable to express the image icon on the basis of the SVG format. Similarly, it is preferable to express characters on the basis of True Type FONT or the like in comparison with bit-mapped font. If, for example, the scaled-up or scaled-down characters are displayed on a screen of a large-scale and low-resolution television (different form high-definition television), it is preferable to scale the characters up or down without increasing the roughness of the characters.

In addition, the dynamically-moving icon and the voice icon cannot be specifically explained by words, but displayed on a screen on the basis of those inner expressive forms. For example, the voice icon may be comprehensively explained by a musical instrumental digital interface (MIDI) and the like. The voice and image icon may be comprehensively explained by a synchronized multimedia integration language (SMIL) and the like.

The operation of the wireless LAN system according to the first embodiment of the present invention will be described hereinafter. As shown in FIG. 2, a user 1900 visits a network manager 1901, and is in his/her house with the network manager 1901.

The user 1900 wishes to have the TV set 2001 display picture data stored in his/her wireless LAN terminal device 1000 as an image. Here, the wireless LAN terminal device 1000 has a picture delivery function which is realized by a unit which is not shown in FIG. 1 and directly related to the present invention, and delivers picture data to the TV set 2001 through the LAN 1200 to be connected to the wireless LAN terminal device 1000.

The following description is directed to a determination on whether or not to permit the wireless LAN terminal device 1000 to establish a connection to the LAN 2000. FIG. 5 is a sequence chart explaining the operation of the wireless LAN system according to the first embodiment of the present invention. The elements of the wireless LAN system the same as those of the wireless LAN system shown in FIG. 1 will not described hereinafter, but bear the same reference numbers as those of the wireless LAN system shown in FIG. 1.

When the wireless LAN terminal device 1000 is requested to establish a connection (data link) to the wireless LAN access point 1100, the read-out unit 1003 reads icon information and terminal identifier from the memory unit 1004 (in step S5000). The connecting unit 1001 transmits, to the connection permitting unit 1102, a connection request, i.e., information necessary to request a connection (in step S5001). Here, the connection request is constituted by a packet having the icon information, the terminal identifier, and the like.

The content of the packet will not be described hereinafter by reason that the present invention does not depend on specific wireless LAN protocol. In general, the packet is like authentication request "AUTHREQ" based on IEEE 802.11b. The packet for connection request includes mnemonic code indicative of the connection request, numerical string indicative of the device identification information 1006, byte sequence constituted by concatenated inner expressive form character string, and the like.

In this embodiment, the inner expressive form expresses an icon on the basis of the SVG format. FIG. 4 is a view showing an inner expressive form expressing, on the basis of the SVG format, an image icon 3002 shown in FIG. 3 as an example. The image icon is expressed by text information constituted by character strings. This text information is copied to the packet to be transmitted to the connection permitting unit 1102.

In this embodiment, the icon information and the connection request have been explained as being transmitted at the same time. However, the icon and the connection request may be transmitted at different times. As another example, the connection permitting unit 1102 may transmit, to the connecting unit 1001, an icon transmission request necessary to request to transmit the icon information after the connecting unit 1001 transmits the connection request to the connection permitting unit 1102. Then, the connecting unit 1001 may transmit the icon to the connection permitting unit 1102 in response to the icon transmission request from the connection permitting unit 1102.

It is difficult to realize the wireless LAN system according to first embodiment of the present invention on the basis of the conventional wireless LAN protocol under the condition that the icon information and the connection request are separately transmitted at different times. The connection request is realized by AUTHREQ (authentication request) based on IEEE 802.11b.

In general, a request corresponding to the authentication request is previously prepared on the basis of another wireless protocol. For example, the device identifier such as MAC address tends to be transmitted with the authentication request. Therefore, the byte sequence for expressing an icon can be added to a packet for authentication request "AUTHREQ" and the like.

The connection permitting unit 1102 receives, from the wireless LAN terminal device 1000, a packet corresponding to the connection request (in step S5101), obtains the icon information from the received packet, and transmits, to the input and output unit 1103, a request to display an icon based on the obtained icon information (in step S5102).

The connection permitting unit 1102 can defines combinations of the connection permission. In general, the conventional wireless LAN access point has a list or the like of device identifiers of the wireless LAN terminal devices permitted to establish a connection to the wireless LAN. When the device identifier extracted from the received packet is the same as one of the device identifiers recorded in the conventional wireless LAN access point, she conventional wireless LAN access point proceeds to step S5103 without proceeding to step S5102. In the wireless LAN system according to the first embodiment of the present invention, the wireless LAN access point does not have a list or the like of device identifiers.

The input and output unit 1103 receives the icon information, and displays an icon on the screen (in step S5201). When, on the other hand, the sound is produced from the received icon information, the sound is outputted from a loudspeaker.

The network manager 1901 determines, on the basis of the image icon displayed on the screen, whether or not to permit the wireless LAN terminal device to establish a connection. When the image icon displayed on the screen is recognized as a well-known icon, and the network manager 1901 makes a determination that a user corresponding to the image icon is permitted to use the wireless LAN, the network manager 1901 may give the user permission. When, on the other hand, the image icon displayed on the screen is recognized as a new icon, the network manager 1901 may give the user rejection if necessary.

The following description is directed to the case that the network manager 1901 does not identify a user 1900 or a wireless LAN terminal device from the image icon displayed on the screen. The network manager 1901 is in the vicinity of the user 1900, and looks at the user 1900 operating his/her wireless LAN terminal device to request a connection to the wireless LAN.

Even if the image icon displayed on the screen is recognized as a new icon, the user 1900 and the network manager 1901 look at the image icon displayed on the screen. When, for example, the user 1900 says "It's may icon.", the network manager 1901 may permit the connection request. The input and output unit 1103 has a button related to "permission". When the button is pushed, the determination may be made that the connection request has been permitted by the network manager 1901.

When, on the other hand, the user 1900 says "The image icon displayed on the screen is different from my icon.", the network manager 1901 may determine that a suspicious person masquerading as a user tries to access the wireless LAN 1200 installed in his/her house without permission. When, for example, the person 2004 masquerading as a user tries to conduct a wiretap, the network manager 1901 can reject the connection request from the person 2004 masquerading as a user.

As described above, the network manager 1901 operates the input and output unit 1103 to determine whether or not to permit the connection request (in step S5202). The connection permitting unit 1102 transmits a response to the connection request to the connecting unit 1001 (in step S5203).

When the connection to the wireless LAN access point 1100 has been permitted by the network manager 1901 and established by the wireless LAN terminal device 1000, the wireless LAN access point 1100 can relay packets from the wireless LAN terminal device 1000 to the TV set 2001, and relay packets to the wireless LAN terminal device 1000 from the TV set 2001.

When, on the other hand, the connection to the wireless LAN access point 1100 has been rejected by the network manager 1901, the wireless LAN access point 1100 cannot relay packets from the wireless LAN terminal device 1000 to the TV set 2001. Even if the wireless LAN terminal device 1000 transmits a packet to the TV set 2001, the wireless LAN terminal device 1000 cannot receive a response to the transmitted packet because time ran out. Therefore, the wireless LAN terminal device 1000 can recognize that the connection request is rejected by the network manager 1901 even if the connection permitting unit 1102 does not transmit a response to the connection request to the connecting unit 1001 in step S5203.

In this embodiment, the wireless LAN access point 1100 performs a relay function between the wireless LAN terminal device 1000 and the TV set 2001 until the wireless LAN terminal device 1000 is disconnected from the wireless LAN access point 1100. And more specifically, the wireless LAN terminal device 1000 is disconnected from the wireless LAN access point 1100 when the wireless LAN terminal device 1000 is turned off, when the wireless LAN terminal device 1000 is away from a service area of the wireless LAN after the user is away from his/her house 2000, or when the connection between the wireless LAN terminal device 1000 and the wireless LAN access point 1100 has been maintained over a predetermined period of time. As a result, the permission received in step S5102 becomes invalid. When, for example, the user 1900 visits his/her house 2000 again, and wishes to use the LAN 1200 by connecting the wireless LAN terminal device 1000 to the LAN 1200, the user 1900 has only to take the authentication procedure again.

In the conventional wireless LAN system, device identifiers of the wireless LAN terminal devices permitted to establish a connection by the network manager are previously registered. Therefore, the connection to the wireless LAN is unlimitedly permitted on the basis of a list of the device identifiers of the permitted wireless LAN terminal devices until the list is updated by the network manager. And the network manager is required to have a special skill and to spend his/her time updating the list by connecting a personal computer to the wireless LAN access point through a wired network.

From the foregoing description, it will be understood that the conventional wireless LAN system is unfit for temporal use and domestic use. Even if the network manager permits the temporal connection request, the network manager tends to forget disconnection. If, on the other hand, the network manager permits the permanent connection request, the network security of the wireless LAN system is apparently decreased by wiretap and the like.

On the other hand, the icon related to a user of a wireless LAN terminal device is displayed on a screen even if, for example, the connection request is transmitted from the wireless LAN terminal device away from the house 2000. Therefore, it is difficult to have the wireless LAN terminal device secretly establish a connection to the wireless LAN even if the registered user tries to request the connection. The wireless LAN system according to the first embodiment of the present invention exceeds the conventional wireless LAN system in network security.

From the foregoing description, it will be understood that the network manager 1901 can check in real time whether or not the wireless LAN terminal device 1000 requests a connection to the wireless LAN access point 1100 installed in a house, by reason that the icon related to the user of the wireless LAN terminal device 1000 is displayed on the screen of the input and output unit 1103 of the wireless LAN access point 1100 when the wireless LAN terminal device 1000 transmits the connection request to the wireless LAN access point 1100. As long as the network manager 1901 rejects the connection request from the wireless LAN terminal device 1000, the wireless LAN terminal device 1000 cannot establish the connection to the wireless LAN access point 1100. Therefore, the network manager 1901 can prevent the user of the wireless LAN terminal device 1000 from wiretapping private communications.

It is easy to permit the connection request from the wireless LAN terminal device by operating the optimally-designed input and output unit 1103 of the wireless LAN access point 1100 (for example, the network manager 1901 can permit the connection request by pushing a button of a graphical user interface (GUI) displaying the icon), and to manage the wireless LAN. Even if the network manager 1901 permits the connection request, the permission becomes invalid when the wireless LAN terminal device 1000 is away from a service area of the wireless LAN. When the wireless LAN terminal device 1000 enters the service area of the wireless LAN again, the network manager 1901 has an opportunity to permit the connection request again. Therefore, the network manager 1901 can permit a temporal connection request from a guest to ensure that the guest uses the wireless LAN temporarily.

In this embodiment, the function blocks of the wireless LAN access point 1100 and the functions of the wireless LAN terminal device 1000 are realized by the CPU. On the other hand, the function blocks of the connection permitting unit 1102, the input and output unit 1103 and the like of the wireless LAN access point 1100 may be realized by respective monolithic integrated circuits, or realized by one or more monolithic integrated circuits. The function blocks of the connecting unit 1001, the read-out unit 1003 and the like of the wireless LAN terminal device 1000 may be realized by respective monolithic integrated circuits, or realized by one or more monolithic integrated circuits. In general, the integrated circuit is simply referred to as "IC", "LSI", "VLSI", or "ULSI" in accordance with its scale.

Further, the function blocks may be realized by respective dedicated processors, respective general-purpose processors, respective field programmable gate arrays, or respective reconfigurable processors operable to reconfigure connections and settings of circuit cells.

Further, the above-mentioned function blocks may be realized by integrated circuits based on another semiconductor technology which will be newly developed or derived from the existing semiconductor technology. As an example, the above-mentioned function blocks may be realized by integrated circuits based on biotechnology.

Additionally, the above-mentioned methods necessary to realize the function blocks are applied to embodiments which will be described hereinafter.

Second Embodiment

FIG. 6 is a block diagram showing the wireless LAN system according to the second embodiment of the present invention. The elements of the wireless LAN system according to the second embodiment the same in construction as those of the wireless LAN system shown in FIG. 1 will not be explained hereinafter, but bear the same reference numbers as those of the wireless LAN system shown in FIG. 1.

As shown in FIG. 6, the function of the input and output unit 1103 of the wireless LAN system according to the first embodiment of the present invention can be realized by a network-ready television set 6000 and a TV remote controller 6001. More specifically, the connection permitting unit 1102 is connected to the network-ready television set 6000 through the LAN 1200 and the network interface 1104, and receives "request for permission to display an icon" from the network-ready television set 6000, and transmits "permission/rejection of a connection request" from the network-ready television set 6000.

The access record database 6100 is constituted as a general-purpose database which can be searched for data, and in which data can be recorded. In the wireless LAN system according to the second embodiment of the present invention, a plurality of combinations of icon information and device identifier, or a plurality of combinations of icon information, device identifier, and determination are recorded in the access record database 6100. The access records 6200 to 6203 are constituted by respective combinations of icon information and device identifier. On the other hand, the access records 9001 to 9004 are constituted by respective combinations of icon information, device identifier, and determination.

FIG. 7 is a block diagram explaining combinations of icon information and device identifier recorded in the access record database 6100. Four combinations of icon information and device identifier are shown in FIG. 7 as having been recorded in the access record database 6100, and sorted in order of date and time on which the combinations stored. Therefore, the latest combination of icon information and device identifier is located at the head of the combinations of icon information and device identifier recorded in the access record database 6100.

Figure 8A:
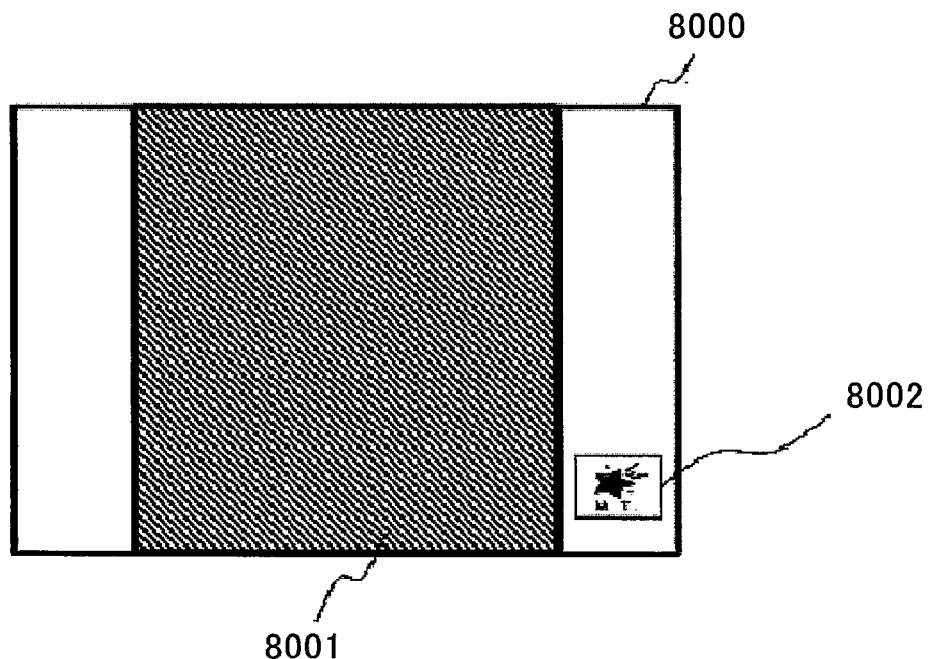
FIG. 8 is views each showing an icon added to an image displayed on a screen of a television set.
Figure 8B:
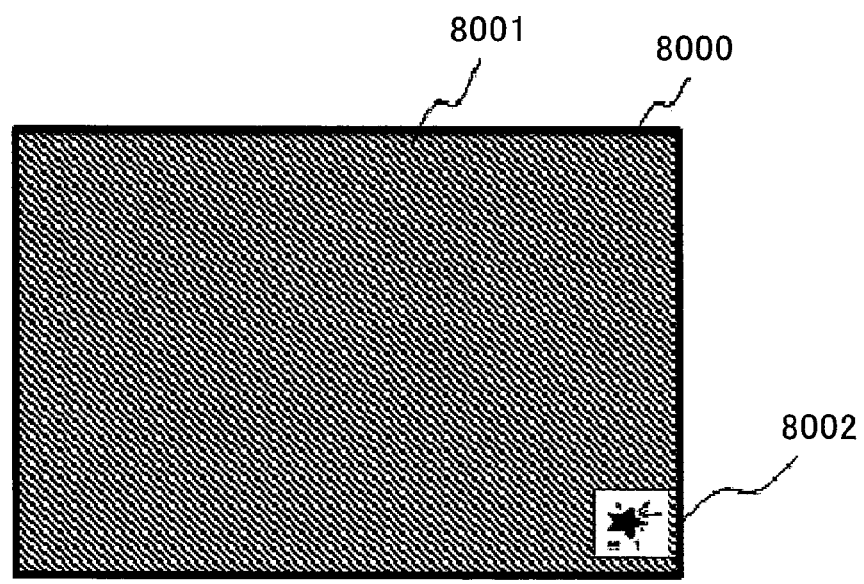

FIGS. 8(A) and 8(B) are schematic views each showing an icon added to an image displayed on a screen 8000 of a television set 6000. As shown in FIGS. 8(A) and 8(B), the television set 6000 has a landscape-oriented screen defined at an aspect ratio "sixteen to nine". In FIG. 8(A), a picture broadcasted at an aspect ratio "three to four" on the basis of NTSC (National Television System Committee) standard is displayed on an area 8001 of the landscape-oriented screen 8000. The icon 8002 is displayed on the remaining part of the landscape-oriented screen 8000.

FIG. 9 is a block diagram explaining combinations of icon information, device identifier, and determination recorded in the access record database 6100, and similar to FIG. 7. In FIG. 9, four combinations of icon information, device identifier, and determination are in the access record database 6100. The combinations of icon information, device identifier, and determination are in the access record database 6100 is sorted in order of date and time on which the combinations stored. As a result, the latest combination of icon information, device identifier, and determination is located at the head of the combinations of icon information device identifier, and determination recorded in the access record database 6100.

The operation of the wireless LAN system according to the second embodiment of the present invention will be described hereinafter. As described in the first embodiment, the user 1900 and the network manager 1901 are is in the house 2000. The user 1900 wishes to use the LAN 1200 through his/her wireless LAN terminal device 1000.

The difference between the first and second embodiments is characterized in that the wireless LAN access point 1100 records, in the access record database 6100, the received combination of the icon information, terminal identifier, and determination on whether or not to permit the connection request. And more specifically, the wireless LAN system according to the second embodiment is characterized in that the wireless LAN terminal device records, in the access record database 6100, determinations on whether or not the network manager 1901 permitted each of the connection requests of the wireless LAN terminal devices when wireless LAN terminal devices tried to request a connection to the wireless LAN.

Figure 10:
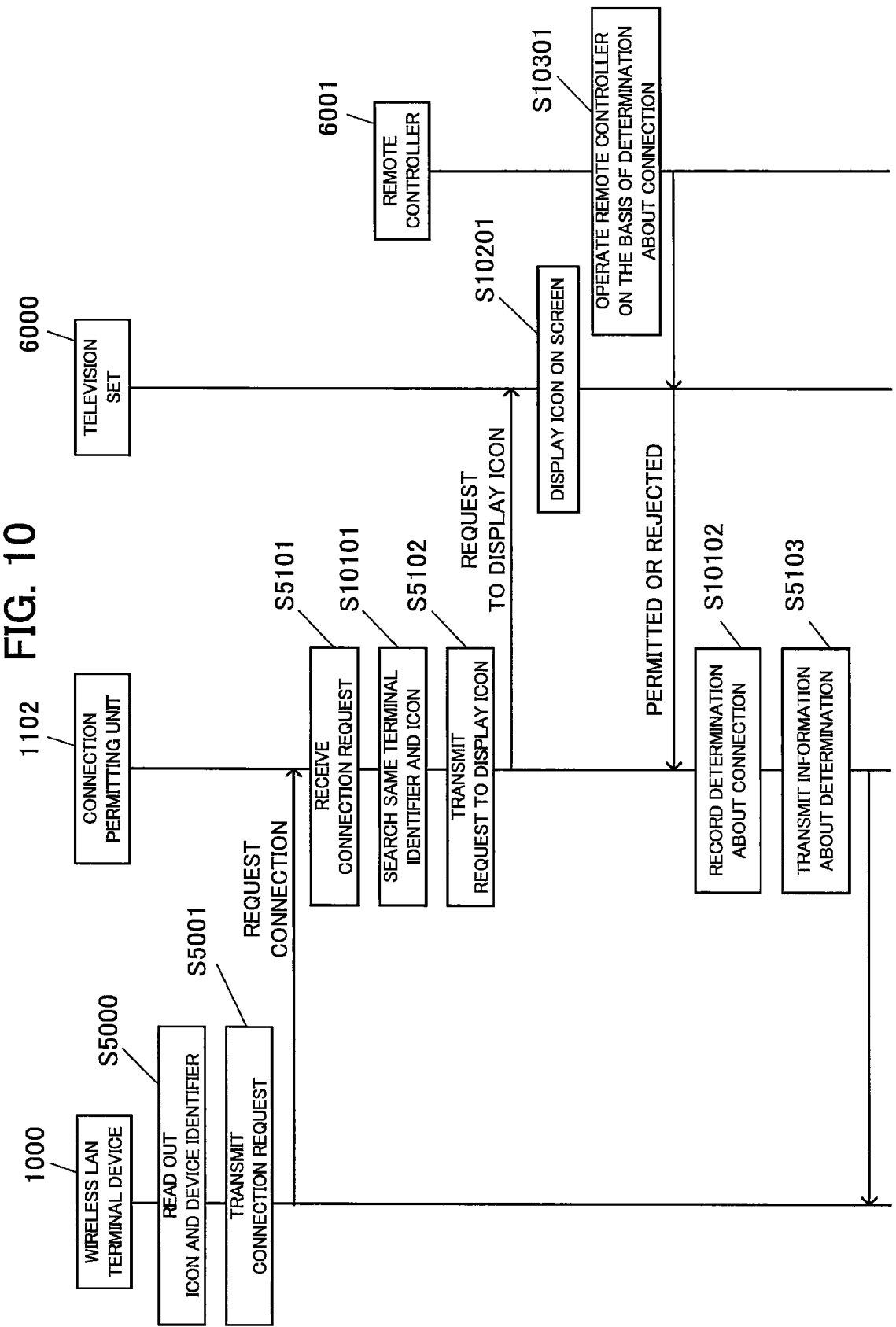
FIG. 10 is a sequence diagram showing the wireless LAN system according to the second embodiment of the present invention.

The operation of the wireless LAN system according to the second embodiment of the present invention will be described hereinafter under the assumption that the access record database 6100 has an access record shown in FIG. 7. The following description is directed to the determination on whether or not to permit the wireless LAN terminal device 1000 to establish a connection to the LAN 1200. FIG. 10 is a sequence diagram showing the wireless LAN system according to the second embodiment of the present invention.

When the wireless LAN terminal device 1000 tries to establish a connection (data link) to the wireless LAN access point 1100, the read-out unit 1003 reads out an icon and a device identifier from the memory unit 1004 (in step S5000). Then, the connecting unit 1001 transmits, to the connection permitting unit 1102, a connection request necessary to request a connection to the wireless LAN access point 1100 (in step S5100).

The connection permitting unit 1102 receives, from the connecting unit 1001, a packet having the connection request (in step S5101), extracts the connection request from the packet, and check whether or not the received icon or device identifier is the same as any one of the icons or device identifiers recorded in the access record database (in step S10101).

It is clear to determine whether or not the received device identifier is the same as the device identifiers recorded in the access record database, by reason that the terminal identifier is represented by MAC address, i.e., numerical string or the like. On the other hand, it is necessary to selectively use following criterions (1), (2), and (3) to determine whether or not the received icon information is the same as the icon information recorded in the access record database.

(1) The received inner expressive form is compared with the inner expressive form recorded in the access record database 6000 "on a byte-to-byte basis". Each of the received inner expressive form and the recorded inner expressive form is constituted as a byte sequence. Therefore, the connection permitting unit 1102 determines, "on a byte-to-byte basis" whether or not the received inner expressive form is the same as the recorded inner expressive form. As a method derived from the above method, the connection permitting unit 1102 may perform a hashing method such as the Message Digest Algorithm 5 (MD5) or the like to calculate hash values from the received icon information and the recorded icon information, and determine whether or not the hash value of the received icon information is the same as the hash value of the recorded icon information. This method is almost the same in advantageous effect as a method of comparing the received icon information with the recorded icon information "on a byte-to-byte basis", and improved in memory capacity.

(2) The received inner expressive form is compared with the inner expressive form recorded in the access record database 6000 "in appearance". Even if comments (FIG. 4, lines 23-24) of the inner expressive form based on the SVG format and shown in FIG. 4 has been deleted, the number of spaces has been increased or decreased, or linefeed has been replaced with one or more spaces, the icon expressed by the original inner expressive form based on the SVG format is the same as the icon expressed by the edited inner expressive form. When, on the other hand, the original inner expressive form is compared with the edited inner expressive form "on a byte-to-byte basis", the determination is made that the original inner expressive form is different from the edited inner expressive form. In other words, when the icon expressed by the original inner expressive form is seemingly the same as the icon expressed by the edited inner expressive form, the judgment is made that the received icon information is the same as the recorded icon information. And more specifically, an icon or a sound expressed by the received icon information is compared with icons or sounds expressed by the recorded icon information on "on a bit-to-bit basis".

(3) When, for example, two icons are compared with each other "on a bit-to-bit basis", the determination may be made that the icons are slightly different each other even though those are recognized as being seemingly the same as each other on the basis of the method (2). In order to avoid the above situation, it is necessary to determine that those are the same as each other when those are recognized as being seemingly the same as each other. For example, the determination may be made whether or not the difference between the icon expressed by the received inner expressive form and the icon expressed by the recorded inner expressive form digitized on the basis of a digitizing method of digitizing the brightness level of the image icon or the sound level of the sound icon exceeds a predetermined threshold value. When the difference between two icons does not exceed the threshold value, the determination is made that those are the same as each other.

The connection permitting unit 1102 performs four different operations on the basis of the combination of icon information and terminal identifier received with the connection request and the combinations of icon information and terminal identifier recorded in the access record database 6100.

The following description is directed to the first case that the connection permitting unit 1102 determines that the combination of icon information and device identifier received with the connection request is not the same as the combinations of icon information and device identifier recorded on the access record database 6100. In other words, the received icon and device identifier have not been seen before.

When, for example, a combination between icon information "ICON-5" and device identifier "ID-3" has been received with the connection request, the connection permitting unit 1102 transmits an icon display request 10102 to the TV set 6000 (in step S5102) by reason that the access record database 6100 does not have a combination between the icon information "ICON-5" and the device identifier "ID-3". When, for example, the TV set 6000 is not in on state, the connection permitting unit 1102 cannot transmit the icon display request 10102 to the TV set 6000. In this case, the connection permitting unit 1102 may retransmit the icon display request 10102 to another input and output unit 1103 shown in FIG. 1 if necessary.

When, for example, the TV set 6000 is in standby state (i.e., apparent off state) and not displaying an image on a screen, the connection permitting unit 1102 may turn on the TV set 6000 through its interface when the judgment is made that the TV set 6000 fails to receive the icon display request 10102 from the connection permitting unit 1102.

When the TV set 6000 is in on state, and displaying, on an area 8001 of a screen 8000, a picture based on the broadcast standard of the National Television System Committee (NTSC), the TV set 6000 displays the icon on the screen 8000 with the picture as shown in FIG. 8 (in step S10201). Here, the position of the icon may be changed if the icon interferes with the picture on the screen, and it is easy for the network manager 1901 to notice the icon displayed on the screen. The icon may maintain to be displayed on the screen until the disconnection is established.

When the network manager 1901 notices the icon displayed on the screen 8000 of the television set 6000, the network manager 1901 may determine whether or not to permit the wireless LAN terminal device 1000 to establish a connection to the LAN 1200. And more specifically, the network manager 1901 may selectively push keys "permission" and "rejection" by using a remote control 6001 (in the step S10301). The determination indicative of "permission" or "rejection" is then transmitted to the connection permitting unit 1102. Then, the connection permitting unit 1102 records the icon information and the device identifier in the access record database 6100 (in the step S10302) after receiving the connection request 10100. In step the same as that of the first embodiment, the connection permitting unit 1102 transmits the determination indicative of "permission" or "rejection".

The following description is then directed to the second case that the connection permitting unit 1102 determines that the icon information is different from the icon information recorded in the access record database 6100, and the received device identifier is the same as one of the device identifier recorded in the access record database 6100. When, for example, icon information "ICON-5" and device identifier "ID-1" are received with connection request, the icon is judged as being at high risk of impersonation by reason that the terminal identifier cannot changed by the user.

In step S5102, the connection permitting unit 1102 output icon display request and impersonation information necessary to inform the network manager 1901 about risk of impersonation. Therefore, the icon and the message "This icon is at high risk of impersonation" may be displayed on the screen of the TV set 6000, or the icon with a red edging may be displayed on the screen of the TV set 6000.

The following description is directed to the third case that the icon information contained in the received connection request is different from the icon information recorded in the access record database 6100, and the device identifier contained in the received connection request is the same as the device identifier recorded in the access record database 6100. When, for example, the combination of icon information "ICON-2" and device identifier "ID-2" is contained in the received connection request, the judgment may be made that the icon of the wireless LAN terminal device 1000 (terminal identifier: ID-1) has been changed by the user 1900, because the user can change/update the icon, but cannot change the device identifier.

In this case, the connection permitting unit 1102 transmits, to the TV set 6000 in step S5102, the icon display request necessary to display on the screen not only the changed icon but also a massage that the previous icon has been changed to the new icon.

When, more specifically, the access record database 6100 has not only hash values of the last and new icons (ICON-1 and ICON-3) but also icon information of the previous and new icons (ICON-1 and ICON-3), the connection permitting unit 1102 may transmit the icon display request for the previous and new icons (ICON-1 and ICON-3), or for new icons ICON-1 to be displayed on the screen of the TV set 6000. If necessary, the previous and new icons, arrowed line, and a message "Icon has changed".

If the former icon information is not in the access record database 6100, for example, a message "Icon has changed" may be displayed on a screen of the TV set 6000, or the position of the icon displayed on the screen may be changed to an irregular position.

The following description is directed to the fourth case that the combination of icon and device identifier contained in the received connection request is the same as one of the combinations of icon and device identifier recorded in the access record database 6100. For example, the combination of icon information "ICON-2" and device identifier "ID-2" contained in the received connection request is determined as being the same as the combination of icon information "ICON-2" and device identifier "ID-2" recorded in the access record database 6100.

In this case, the connection permitting unit 1102 transmits, to the TV set 6000, icon display request necessary to have the TV set 6000 display the icon on the screen, and to inform the network manager 1901 about whether or not the currently received combination is the same as the previously received combination.

The following description is directed to the case that the access record data base 6100 has combinations of icon information, device identifier, and determination. In this case, the network manager 1901 can manage the wireless LAN with ease and accuracy on the basis of icon and various information displayed on the screen of the TV set 6000 or the input and output unit 1103.

In step S5102, the connection permitting unit 1102 transmits, to the TV set 6000, icon display request further including previous determination recorded in the access record database 6100. Therefore, the wireless LAN system according to the second embodiment can reduce an effort to determine whether or not to permit the connection request by allowing the network manager 1901 to determine, on the basis of the displayed icon and previous determination, whether or not to permit the connection request.

The network manager 1901 cannot recall, from the access record database 6100 having combinations of icon information and device identifier, determination on whether or not the previous connection request was permitted in the above-mentioned fourth case. On the other hand, the network manager 1901 can obtain the previous determination from the access record database 6100 having combinations of icon information, device identifier, and determination as shown in FIG. 9. It may be inferred, from the determination that the connection request was not permitted in the above-mentioned fourth case, that the current connection request is invalid. Therefore, the wireless LAN system according to the second embodiment can allow the network manager 1901 to determine, on the basis of the combinations shown in FIG. 9, whether or not to permit the connection request with ease and accuracy.

On the other hand, the wireless LAN system according to the second embodiment can automatically determine, on the basis of the access record database without network manager's determination, whether or not to permit the connection request. If, for example, four or more connection requests are received in the last month, and permitted by the network manager, the user corresponding to the connection requests received in the last month and permitted by the network manager may be identified as a person that often visits the network manager 1901. Even if the wireless LAN system according to the second embodiment can automatically determine whether or not to permit the connection request, it is important and useful to display the icon of the wireless LAN terminal device on the screen as a function for monitoring the network.

Third Embodiment

Figure 11:
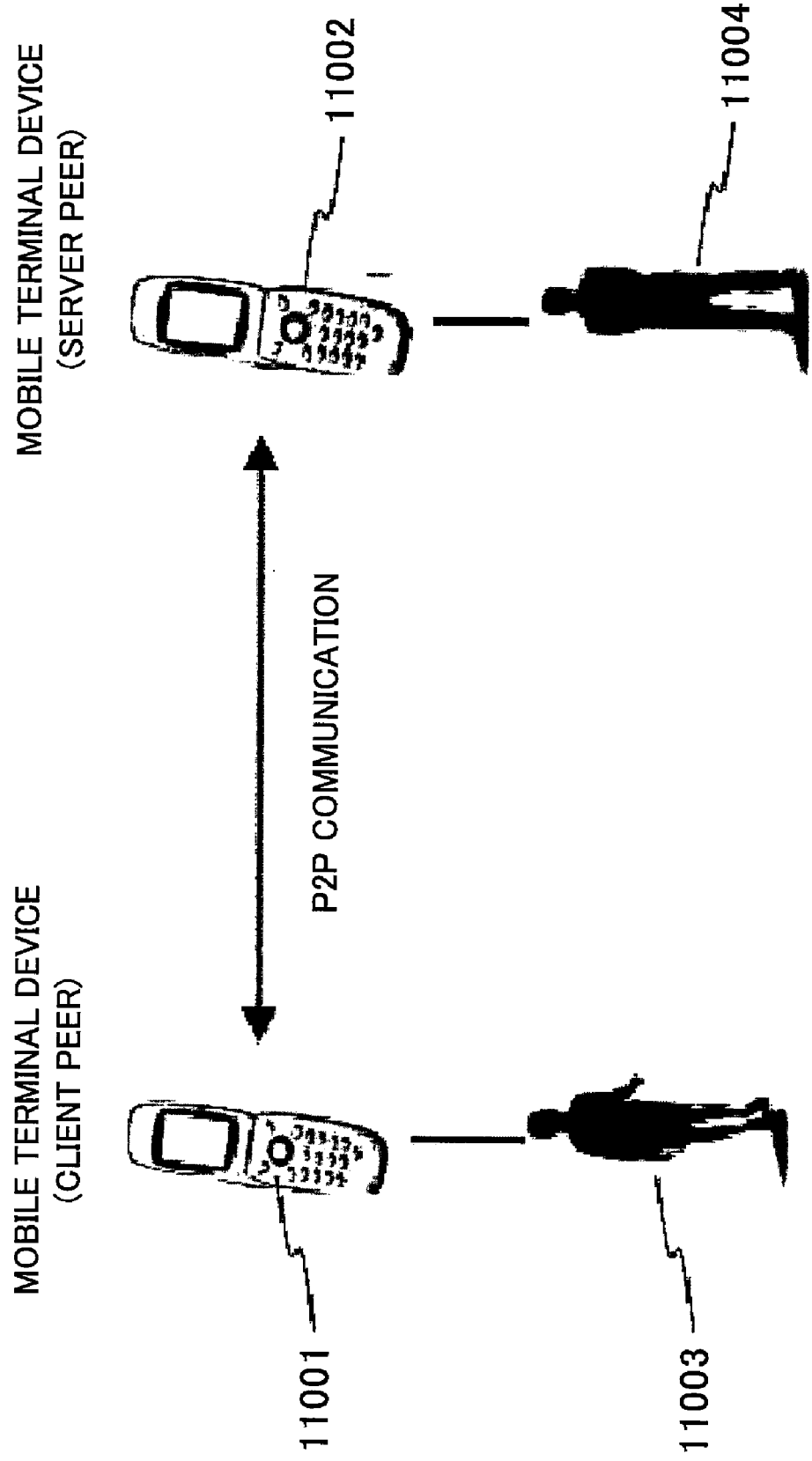
FIG. 11 is a block diagram showing a wireless LAN system according to the third embodiment of the present invention.

FIG. 11 is a block diagram showing a wireless LAN system according to the third embodiment of the present invention. Each of the wireless LAN systems according to the first and second embodiments has been explained as including a wireless LAN access point located at the center of the communication network defined as so-called "hub-model" (or "server-client model"). The mobile terminal devices are connected to each other through the wireless LAN access point located at the center of the communication network, and are not directly connected to each other in the first and second embodiments. On the other hand, the mobile terminal devices are directly connected to each other, and perform peer-to-peer communication (hereinafter simply referred to as "P2P communication") with each other in the third embodiment.

The mobile terminal devices 11001 and 11002 have wireless LAN function, and perform P2P communication with each other. Each of the mobile terminal devices 11001 and 11002 can serve as a client peer operable to start to perform communication, and output authentication request and the like. Each of the mobile terminal devices 11001 and 11002 can serve as a server peer operable to process various requests from the client peer.

The mobile terminal device 11001 cannot exchange a role with the mobile terminal device 11002 before establishing connection with the mobile terminal device 11002.

In the wireless LAN system according to the first and second embodiments, the wireless LAN terminal device 1000 corresponds to a client peer. On the other hand, the wireless LAN access point 1100 corresponds to a server peer.

Figure 12:
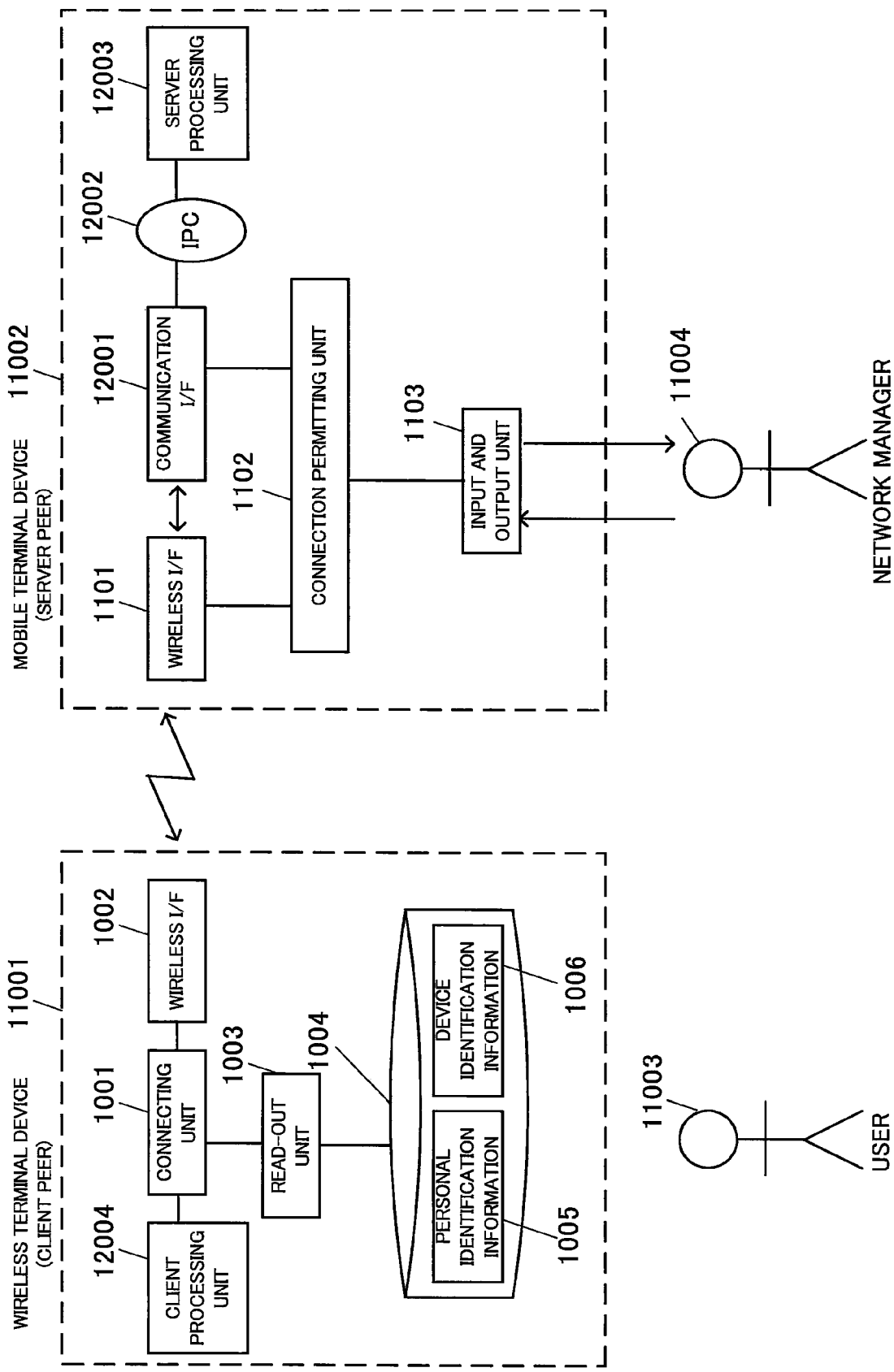
FIG. 12 is a block diagram showing wireless terminal devices according to the third embodiment of the present invention.

FIG. 12 is a block diagram showing the mobile terminal device according to the third embodiment of the present invention. The elements of the mobile terminal device according to the third embodiment the same in construction as those of the wireless LAN system shown in FIG. 1 will not be explained hereinafter, but bear the same reference numbers as those of the wireless LAN system shown in FIG. 1.

The mobile terminal device 11001 includes a client processing unit 12004 to be realized by an application program to be executed by the CPU, while the mobile terminal device 11002 includes a server processing unit 12003 to be realized by an application program to be executed by the CPU.

The client processing unit 12004 starts to perform wireless communication with the server processing unit 12003 when the mobile terminal device 11001 establishes connection with the mobile terminal device 11002. For example, the client processing unit 12004 and the server processing unit 12003 may exchange electronic business cards with the server processing unit 12003, or have a chat to exchange natural language sentences with each other, or perform voice communication with each other.

As will be seen from one example of Bluetooth applications, under the condition that the mobile terminal device 11002 has functions of an audio playback device, and the mobile terminal device 11001 has functions of a headphone, the server processing unit 12003 may transmit an electronic file indicative of music or the like, and the client processing unit 12004 may reproduce music or the like from the received electronic file. In general, the mobile terminal devices 11001 and 11002 may be owned and operated by one user.

Further, the interprocess communication (IPC) may be performed in the mobile terminal device 11002 through a mechanism 12002 for the IPC. On the other hand, the mechanism 12002 may function as a unit for procedure call in a process or task. In short, the connection permitting unit 1102 and the wireless interface 1101 output information or data to the server processing unit 12003 through the communication interface 12001 and the mechanism 12002 corresponding to the LAN 1200 shown in FIG. 1.

The communication interface 12001 is different from the network interface 1104 shown in FIGS. 1 and 6 in a narrow sense, but the same in preliminary preparation for communication as the network interface 1104. The network interface 1104 has a role to convert information and data into a form based on the wireless LAN protocol, and transmit the converted information and data by wireless. On the other hand, the wireless interface 12001 according to the third embodiment has a role to convert information and data into a form for the mechanism 12002, and transmit the converted information and data to applications for the mobile terminal device.

The wireless interfaces 1002 and 1101 functions as interface devices connected to the wireless LAN, but are respectively different from the wireless interfaces 1002 and 1101 shown in FIGS. 1 and 6 for the following reasons. In the wireless LAN system shown in FIGS. 1 and 6, the wireless LAN access point 1100 performs wireless communication with two or more wireless LAN terminal devices. On the other hand, the mobile terminal device 11002 performs P2P communication with one wireless LAN terminal device. And more specifically, the mobile terminal device 11002 performs P2P communication with one wireless LAN terminal device in ad-hoc mode with reference to IEEE 802.11b or Bluetooth.

As shown in FIGS. 1 and 6, the input and output unit 1103 is exemplified by a display, a network-ready television set, or the like. However the input and output unit 1103 may be exemplified by a display, ten keys, function keys, a loudspeaker, and a microphone under the condition that the mobile terminal device 11002 is constituted by a mobile phone.

The P2P-model wireless LAN system thus constructed as previously mentioned is almost the same in construction as the hub-model wireless LAN system shown in FIG. 1, and can expect an advantageous effect the same as that of the hub-model wireless LAN system shown in FIG. 1. As an example, each of the mobile terminal devices 11001 and 11002 may be constituted by a mobile phone having a screen. In this case, the icon indicative of user 11003 is displayed on the input and output unit 1103 of the mobile terminal device (for example, the screen of the mobile phone).

The user 11004 can input a determination on whether or not to permit a connection on the basis of the icon displayed on the screen by operating the input and output unit 1103 (such as for example ten keys of a mobile phone). The user 11004 may input a sound icon by using a loudspeaker and a microphone.

Each of the mobile terminal devices 11001 and 11002 constituted as a P2P-type device can selectively serve as a client and a server peer. In other words, the mobile terminal device 11002 is the same in construction as the mobile terminal device 11001, and has icon information, device identifier, and the like as a client peer.

When the mobile terminal device 11002 makes a response to the connection request received from the mobile terminal device 11001 in step S5103 shown in FIG. 5, the mobile terminal device 11002 may transmit its icon information and device identifier to the mobile terminal device 11001 with the response to the connection request. In this case, the mobile terminal device 11001 can display an icon based on the received icon information on a screen. The user of the mobile terminal device 11001 can check, from the icon displayed on the screen, a user which has made a determination on whether or not whether or not to permit the connection in response to the connection request.

INDUSTRIAL APPLICABILITY

Even if the wireless LAN is used at home, in the office and the like without being managed by an experienced network manager, or the wireless LAN is temporally used by specific persons, the wireless LAN system according to the present invention can provide the wireless LAN enhanced in network security and usability to users, and useful for the wireless LAN for domestic use or the like.

The invention claimed is:

1. A wireless communication apparatus for performing wireless communication with a wireless terminal device having personal identification information necessary to identify a person as a registered user, comprising:
  a wireless communication unit operable to receive said personal identification information outputted from said wireless terminal device through a wireless communication network;
  a personal identification information output control unit operable to have an information output device output said personal identification information received by said wireless communication unit;
  a connection permitting unit operable to receive information on whether or not a connection is permitted by a network manager on the basis of said personal identification information received by said wireless communication unit, and to allow said wireless terminal device to establish said connection when said connection is permitted by said network manager; and
  a communication unit having said personal identification information, wherein
  when said connection is permitted by said network manager, said communication unit transmits, through said wireless communication network, said personal identification information to a wireless terminal device which has been permitted to establish said connection.

2. A wireless communication apparatus for performing wireless communication with a wireless terminal device having personal identification information necessary to identify a person as a registered user, comprising:
  a wireless communication unit operable to receive said personal identification information outputted from said wireless terminal device through a wireless communication network;
  a personal identification information output control unit operable to have an information output device output said personal identification information received by said wireless communication unit;
  a connection permitting unit operable to receive information on whether or not a connection is permitted by a network manager on the basis of said personal identification information received by said wireless communication unit, and to allow said wireless terminal device to establish said connection when said connection is permitted by said network manager; and
  a communication unit operable to perform communication with a network different from said wireless communication network, wherein
  said communication unit relays data from said wireless communication network to said network different from said wireless communication network,
  said network different from said wireless communication network is connected to a television set,
  said personal identification information output control unit has said information output device output, to said television set, said personal identification information received by said wireless communication unit, and said connection permitting unit receives, from said television set, information about whether or not said network manager has permitted said wireless terminal device to establish said connection on the basis of said personal identification information outputted by said television set.

3. A wireless communication apparatus for performing wireless communication with a wireless terminal device having personal identification information necessary to identify a person as a registered user, comprising:
a wireless communication unit operable to receive said personal identification information outputted from said wireless terminal device through a wireless communication network;
a personal identification information output control unit operable to have an information output device output said personal identification information received by said wireless communication unit;
a connection permitting unit operable to receive information on whether or not a connection is permitted by a network manager on the basis of said personal identification information received by said wireless communication unit, and to allow said wireless terminal device to establish said connection when said connection is permitted by said network manager; and
a database having, information corresponding to said personal identification information and information corresponding to device identification information necessary to identify a device as a registered device, wherein
said wireless communication unit receives said personal identification information and device identification information from said wireless terminal device through said wireless communication network,
said personal identification information output control unit has said information output device output said personal identification information and said device identification information received by said wireless communication unit on the basis of a condition resulting from said information stored in said database and said personal identification information and said device identification information received by said wireless communication unit, and
when it is determined that said personal identification information received by said wireless communication unit is the same as personal identification information stored in said database, and said device identification information received by said wireless communication unit is not the same as device identification information corresponding to said personal identification information determined as being the same as said personal identification information received by said wireless communication unit, said personal identification information output control unit warns said network manager by having said information output device output said personal identification information received by said wireless communication unit.

4. A wireless communication apparatus for performing wireless communication with a wireless terminal device having personal identification information necessary to identify a person as a registered user, comprising:
a wireless communication unit operable to receive said personal identification information outputted from said wireless terminal device through a wireless communication network;
a personal identification information output control unit operable to have an information output device output said personal identification information received by said wireless communication unit;
a connection permitting unit operable to receive information on whether or not a connection is permitted by a network manager on the basis of said personal identification information received by said wireless communication unit, and to allow said wireless terminal device to establish said connection when said connection is permitted by said network manager; and
a database having, information corresponding to said personal identification information and information corresponding to device identification information necessary to identify a device as a registered device, wherein said wireless communication unit receives said personal identification information and device identification information from said wireless terminal device through said wireless communication network,
said personal identification information output control unit has said information output device output said personal identification information and said device identification information received by said wireless communication unit on the basis of a condition resulting from said information stored in said database and said personal identification information and said device identification information received by said wireless communication unit, and
when it is determined that said device identification information received by said wireless communication unit is the same as device identification information stored in said database, and said personal identification information received by said wireless communication unit is not the same as personal identification information corresponding to device identification information determined as being the same as said device identification information received by said wireless communication unit, said personal identification information output control unit has said information output device output said personal identification information received by said wireless communication unit and said personal identification information corresponding to device identification information determined as being the same as said device identification information received by said wireless communication unit.

5. A wireless communication apparatus for performing wireless communication with a wireless terminal device having personal identification information necessary to identify a person as a registered user, comprising:
a wireless communication unit operable to receive said personal identification information outputted from said wireless terminal device through a wireless communication network;
a personal identification information output control unit operable to have an information output device output said personal identification information received by said wireless communication unit;
a connection permitting unit operable to receive information on whether or not a connection is permitted by a network manager on the basis of said personal identification information received by said wireless communication unit, and to allow said wireless terminal device to establish said connection when said connection is permitted by said network manager; and
a database having, information corresponding to said personal identification information and information corresponding to device identification information necessary to identify a device as a registered device, wherein said wireless communication unit receives said personal identification information and device identification information from said wireless terminal device through said wireless communication network, said personal identification information output control unit has said information output device output said personal identification information and said device identification information received by said wireless communication unit on the basis of a condition resulting from said information stored in said database and said personal identification information and said device identification information received by said wireless communication unit, and when it is determined that said device identification information received by said wireless communication unit is the same as device identification information contained in said database, and said personal identification information received by said wireless communication unit is the same as personal identification information corresponding to device identification information determined as being the same as said device identification information received by said wireless communication unit, said personal identification information output control unit informs said network manager that said connection is established on the basis of said personal identification information and said device identification information received by said wireless communication unit by having said information output device output said personal identification information received by said wireless communication unit.

6. A wireless communication apparatus according to claim 5, wherein information on whether or not said connection was previously permitted by said network manager is related to said information stored in said database, and stored in said database, said personal identification information output control unit informs said network manager about whether or not said connection was previously permitted by said network manager, by having said information output device output said personal identification information received by said wireless communication unit.

7. A wireless communication apparatus according to claim 1, wherein instead of having said personal identification information output control unit inform said network manager about whether or not said connection was previously permitted by said network manager, by having said information output device output said personal identification information received by said wireless communication unit, said connection permitting unit allows said wireless terminal device to establish said connection when said information stored in said database indicates a determination that said connection was previously permitted by said network manager.

8. A wireless communication apparatus according to claim 1, wherein said personal identification information is constituted by information about an icon, said information being expressed in a form necessary to scale said icon to a designated size.

9. A wireless communication apparatus according to claim 1, wherein said personal identification information is constituted by information about an icon which has an image, a portrait, or a sketch of a face or a body of a user of said wireless terminal device being expressed in a form necessary to scale said icon to a designated size.

10. A wireless communication apparatus according to claim 1, wherein said personal identification information is constituted by information about an icon which has a voice of a user of said wireless terminal device.

11. A wireless communication apparatus according to claim 1, wherein said personal identification information is constituted by information about an icon which has a name or initials of a user of said wireless terminal device.

12. A wireless communication apparatus according to claim 1, wherein said personal identification information is constituted by information about an icon which has an image showing a signature or a seal of a user of said wireless terminal device.

13. A wireless communication apparatus according to claim 1, wherein said connection permitting unit disconnects said wireless terminal device from said wireless communication network when said wireless terminal device is used outside a cellular phone's communication area, after establishing said connection.

14. A wireless communication apparatus according to claim 1, wherein said connection permitting unit disconnects said wireless terminal device from said wireless communication network when a predetermined period of time has elapsed since said wireless terminal device established said connection.

15. A wireless communication apparatus according to claim 1, wherein said personal identification information output control unit continues to have said information output device output said personal identification information received by said wireless communication unit until said connection permitting unit disconnects said wireless terminal device from said wireless communication network.

16. A wireless communication system comprising:

a wireless terminal device having personal identification information necessary to identify a person as a registered user; and a wireless communication apparatus operable to perform communication with said wireless terminal device, wherein said wireless communication apparatus includes:

a wireless communication unit operable to receive said personal identification information outputted from said wireless terminal device through a wireless communication network;

a personal identification information output control unit operable to have an information output device output said personal identification information received by said wireless communication unit; and a connection permitting unit operable to receive information on whether or not a connection is permitted by a network manager on the basis of said personal identification information received by said wireless communication unit, and to allow said wireless terminal device to establish said connection when said connection is permitted by said network manager; and a communication unit having said personal identification information, and wherein when said connection is permitted by said network manager, said communication unit transmits, through said wireless communication network, said personal identification information to a wireless terminal device which has been permitted to establish said connection.

* * * * *